US008604136B2

(12) United States Patent
Lohse et al.

(10) Patent No.: US 8,604,136 B2
(45) Date of Patent: Dec. 10, 2013

(54) PROCESS FOR MAKING DENDRITIC HYDROCARBON POLYMERS

(75) Inventors: David John Lohse, Bridgewater, NJ (US); Nikos Hadjichristidis, Athens (GR); Andy Haishung Tsou, Allentown, PA (US); Suzzy C. H. Ho, Princeton, NJ (US); Paul Edward Schuenzel, Morris Plains, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 270 days.

(21) Appl. No.: 12/904,428

(22) Filed: Oct. 14, 2010

(65) Prior Publication Data

US 2011/0118420 A1     May 19, 2011

Related U.S. Application Data

(60) Provisional application No. 61/279,127, filed on Oct. 16, 2009.

(51) Int. Cl.
*C08C 19/02* (2006.01)
*C08C 19/44* (2006.01)
*C08G 81/02* (2006.01)

(52) U.S. Cl.
USPC ............. 525/332.3; 525/331.9; 525/333.1; 525/333.2; 525/333.3; 525/332.9; 525/338; 525/342

(58) Field of Classification Search
USPC .......... 525/331.9, 333.1, 333.2, 333.3, 332.3, 525/332.9, 338, 342
See application file for complete search history.

(56) References Cited

U.S. PATENT DOCUMENTS

| | | | |
|---|---|---|---|
| 3,377,404 A | 4/1968 | Zelinski | |
| 3,598,884 A | 8/1971 | Wei | |
| 3,954,894 A | 5/1976 | Kamienski et al. | |
| 4,200,718 A | 4/1980 | Tung et al. | |
| 4,284,835 A | 8/1981 | Kim et al. | |
| 4,311,818 A | 1/1982 | Sigwalt et al. | |
| 4,482,677 A * | 11/1984 | Teranaka et al. | 525/250 |
| 4,980,331 A | 12/1990 | Hoxmeier et al. | |
| 5,360,875 A | 11/1994 | Masse et al. | |
| 6,221,975 B1 | 4/2001 | Shin et al. | |
| 6,391,998 B1 | 5/2002 | Garcia-Franco et al. | |
| 6,417,281 B1 | 7/2002 | Garcia-Franco et al. | |
| 2007/0135583 A1 | 6/2007 | Lohse et al. | |
| 2009/0163666 A1 | 6/2009 | Lohse et al. | |

FOREIGN PATENT DOCUMENTS

| | | |
|---|---|---|
| EP | 0673954 | 4/1999 |
| WO | 0208300 | 1/2002 |
| WO | 2005060444 | 7/2005 |

OTHER PUBLICATIONS

Hadjichristidis et al., Macromolecules 33 (2000) 2424-2436.*
Velis, Gabriel, Synthesis of Model PS(PI)5 and (PI)5PS(PI)5 Nonlinear Block Copolymers of Styrene (S) and Isoprene (I), Macromolecules, vol. 32, No. 2, Jan. 26, 1999 ,pp. 534-536.
E. van Ruymbeke, K.,Orfanou, M. Kapnistos, N. Hadjichristidis, D.J. Lohse, D. Vlassopoulos, "Entangled Dendritic Polymers and Beyond: Linear Rheology of Symmetric Cayley-Tree Polymers and Macromolecular Self-assemblies", Macromolecules, 2007, 40, 5941.
J.H. Lee, K. Orfanou, P. Driva, N. Hadjichristidis, P.J. Wright, S.P. Rucker, D.J. Lohse, "Linear and Nonlinear Rheology of Dendritic Star Polymers: Experiment", Macromolecules, 2008, 41, 9165.
N. Hadjichristidis, M. Xenidou, H. Iatrou, M. Pitsikalis, Y. Poulos, A. Avgeropoulos, S. Sioula, S. Paraskeva, G. Velis, D.J. Lohse, D.N. Schulz, L.J.Fetters, P.J. Wright, R.A. Mendelson, C.A. Garcia-Franco, T. Sun, C.J. Ruff, "Model Long Chain Branched Polyethylene: Part 1: Synthesis and Characterization", Macromolecules, 2000, 33, 2424.
D.J. Lohse, S.T. Milner, L.J. Fetters, M. Xenidou, N. Hadjichristidis, R.A. Mendelson, C.A. Garcia-Franco, M.K. Lyon, "Well-Defined, Model Long Chain Branched Polyethylene: Part 2: Melt Rheological Behavior", Macromolecules, 2002, 35, 3066.
G. Koutalas, D.J. Lohse, N. Hadjichristidis, "Well-Defined Comb, Star-Comb and Comb-on-Comb Polybutadienes by Anionic Polymerization and the Macromonomer Strategy", 2005, 38, 4996.
G. Koutalas, D.J. Lohse, N. Hadjichristidis, "Novel Block-Comb/ Graft Copolymers by Using the Macromonomer Strategy and Anionic Polymerization", Journal of Polymer Science—Chemistry, 2005, 43, 4040.
P. Driva, H. Iatrou, D.J. Lohse, N. Hadjichristidis, "Anionic Homo- and Copolymerization of Double-Tailed Macromonomers: A Route to Novel Macromolecular Architectures", Journal of Polymer Science—Chemistry, 2005, 43, 4070.
K. Orfanou, H. Iatrou, D.J. Lohse, N. Hadjichristidis, "Synthesis of Well-Defined Second (G-2) and Third (G-3) Generation Dendritic Polybutadienes", Macromolecules, 2006, 39, 4361.
M. Kapnistos, G. Koutalas, N. Hadjichristidis, D.L. Roovers, D.J. Lohse, D. Vlassopoulos, "Linear rheology of comb polymers with star-like backbones: Melts and Solutions", Rheologica Acta, 2006, 46, 273.

(Continued)

*Primary Examiner* — Roberto Rabago
(74) *Attorney, Agent, or Firm* — Robert A. Migliorini

(57) ABSTRACT

A process for making a substantially saturated dendritic hydrocarbon polymer. The process has the following steps: (a) polymerizing an amount of one or more alkadiene monomers and/or one or more alkenylaromatic polymers under anionic conditions in the presence of a di- or tri-functional organic lithium initiator to produce a polyalkadiene defining a multiplicity of lithiated chain ends; (b) reacting the polyalkadiene with an amount of a tri- or di-functional silane coupling agent to form a dendritic polyalkadiene; and (c) hydrogenating the dendritic polyalkadiene to form a substantially saturated dendritic hydrocarbon polymer. Also a process for process for making a dendritic hydrocarbon polymer, comprising: (a) polymerizing an amount of one or more alkadiene monomers and/or one or more alkenylaromatic polymers under anionic conditions in the presence of a di- or tri-functional organic lithium initiator to produce a hydrocarbon polymer defining a multiplicity of lithiated chain ends; and (b) reacting the hydrocarbon polymer with an amount of a tri- or di-functional silane coupling agent to form a dendritic hydrocarbon polymer.

20 Claims, 21 Drawing Sheets

(56) References Cited

OTHER PUBLICATIONS

E. van Ruymbeke, K. Orfanou, M. Kapnistos, N. Hadjichristidis, D.J. Lohse, D. Vlassopoulos, "Entangled Dendritic Polymers and Beyond: Linear Rheology of Symmetric Cayley-Tree Polymers and Macromolecular Self-assemblies", Macromolecules, 2007, 40, 5941.

P. Driva, D.J. Lohse, N. Hadjichristidis, "Well-Defined Complex Macromolecular Architectures by Anionic Polymerization of Styrenic Single and Double Homo/Miktoarm Star-Tailed Macromonomers", Journal of Polymer Science—Chemistry, 2008, 46, 1826.

* cited by examiner

PROCESS FOR MAKING DENDRITIC HYDROCARBON POLYMERS

CROSS-REFERENCE TO RELATED APPLICATIONS

This is a non-provisional application that claims priority to U.S. Provisional Patent Application No. 61/279,127 filed on Oct. 16, 2009, herein incorporated by reference in its entirety.

FIELD

The present disclosure relates to a process for making dendritic hydrocarbon polymers.

BACKGROUND

Polymers that have long branches (i.e., long enough to become entangled with other polymer strands) have qualitatively different flow behavior than those which are purely linear, and this profoundly affects the processing and crystallization of these polymers. It is often desirable to incorporate an amount of polymers having long-chain-branching (LCB) into polymers to achieve particular processability and properties. Dendritic polymers can be very useful in this regard, but their synthesis can be laborious and expensive.

While LCB technology has been a part of the polyethylene industry since the 1930's, there is still a need to further optimize the type and availability of LCB polyethylenes and other polymers. A useful, inexpensive blend additive in the form of a LCB polymer could significant impact the processing/performance balance for polyethylenes, particularly the multi-billion dollar market for polyethylene films and molded articles. There could be even greater use in polypropylene, where there is currently little commercially viable technology for incorporating LCB. There is also a need for LCB polymers in the EPDM elastomer market.

Conventional polyethylenes, such as LDPE produced via high pressure free radical polymerization, typically exhibit a broad distribution of LCB. With the advent of metallocenes and other single-site coordination catalysts, there have been many products with narrower degrees of LCB (such as Enable from EMCC, and Engage from The Dow Chemical Company).

It would be desirable to have a new process for producing LCB polymers. It would be further desirable to have a new process for producing LCB olefin and alkenyl aromatic polymers.

SUMMARY

According to the present disclosure, there is provided a process for making a substantially saturated dendritic hydrocarbon polymer. The process has the following steps: (a) polymerizing an amount of one or more alkadiene monomers and/or one or more alkenylaromatic polymers under anionic conditions in the presence of a difunctional organic lithium initiator to produce a hydrocarbon polymer defining a multiplicity of lithiated chain ends; (b) reacting the hydrocarbon polymer with an amount of a trifunctional silane coupling agent to form a dendritic hydrocarbon polymer; and (c) hydrogenating the dendritic hydrocarbon polymer to form a substantially saturated dendritic hydrocarbon polymer.

Further according to the present disclosure, there is provided a process for making a dendritic hydrocarbon polymer. The process has the following steps:. (a) polymerizing an amount of one or more alkadiene monomers and/or one or more alkenylaromatic polymers under anionic conditions in the presence of a difunctional organic lithium initiator to produce a hydrocarbon polymer defining a multiplicity of lithiated chain ends and (b) reacting the hydrocarbon polymer with an amount of a trifunctional silane coupling agent to form a dendritic hydrocarbon polymer.

Still further according to the present disclosure, there is provided another process for making a substantially saturated dendritic hydrocarbon polymer. The process has the following steps: (a) polymerizing an amount of one or more alkadiene monomers and/or one or more alkenylaromatic polymers under anionic conditions in the presence of a trifunctional organic lithium initiator to produce a hydrocarbon polymer defining a multiplicity of lithiated chain ends; (b) reacting the hydrocarbon polymer with an amount of a difunctional silane coupling agent to form a dendritic hydrocarbon polymer; and (c) hydrogenating the dendritic hydrocarbon polymer to form a substantially saturated dendritic hydrocarbon polymer.

Still yet further according to the present disclosure, there is provided another process for making a dendritic hydrocarbon polymer. The process has the following steps: (a) polymerizing an amount of one or more alkadiene monomers and/or one or more alkenylaromatic polymers under anionic conditions in the presence of a trifunctional organic lithium initiator to produce a hydrocarbon polymer defining a multiplicity of lithiated chain ends and (b) reacting the hydrocarbon polymer with an amount of a difunctional silane coupling agent to form a dendritic hydrocarbon polymer.

DETAILED DESCRIPTION

Figure 1:
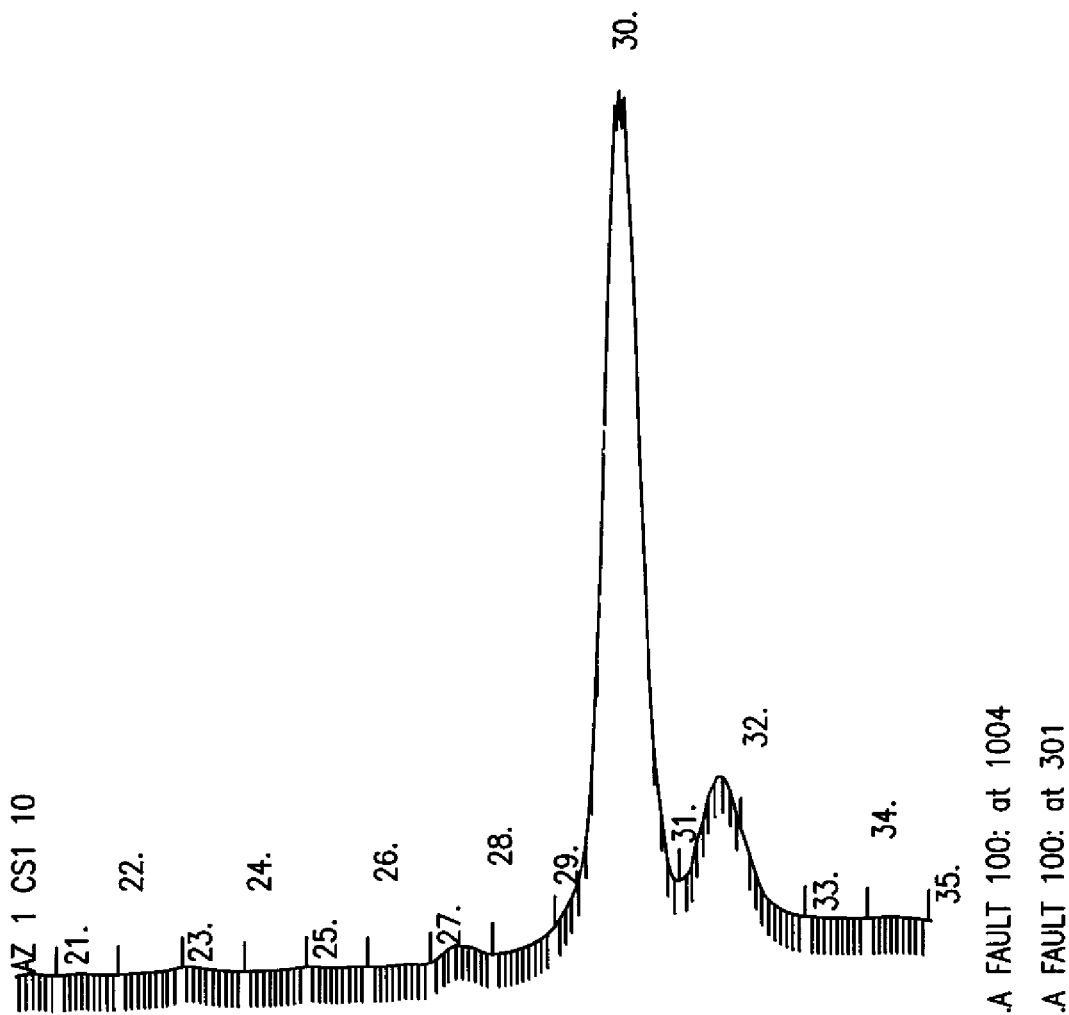
FIG. 1 is a GPC plot of dilithium PBd before the addition of TCS in Example 3.

All numerical values within the detailed description and the claims herein are modified by "about" or "approximately" the indicated value, and take into account experimental error and variations that would be expected by a person having ordinary skill in the art.

Synthesis of dendritic polymers is relatively difficult and expensive, and heretofore has not been feasible to produce commercially. The process of the present disclosure for making dendritic polymers affords synthesis at potentially lower cost than previous processes while affording a high degree of control with respect to polymer architecture. The dendritic polymers are useful as rheology-enhancing blend additives in polymer materials or compositions.

The structure below is an example of a polymer of dendritic architecture that physically resembles some of the most highly branched molecules found in low density polyethylene (LDPE) produced in high pressure (HP) processes. The structure is an example of a third-generation dendritic polymer.

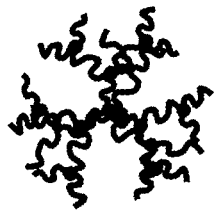

The process of the present disclosure employs (1) anionic polymerization or copolymerization of alkadienes or alkenyl aromatics via di- or tri-functional organic lithium initiators followed by (2) coupling with a di- or tri-functional silane coupling agent followed by (3) hydrogenation to complete substantial saturation of a dendritic polymer product.

One embodiment of the present disclosure is the production of a dendritic polymer from polybutadiene (PBd). Di-functionalized PBd is produced from butadiene monomer in the presence of a difunctional initiator, such as 1,3-bis(1-phenyl-3 methyl pentyl lithium)benzene. During polymerization, the polymer chain extends out in both directions ultimately resulting in a di-lithiated chain, with Li atoms at each end. The di-functionalized PBd is reacted with a tri-functional coupling agent, $SiCl_3CH_3$ (trichlorosilane or TCS), to couple functionalized chain ends to make a dendritic polymer. The dendritic polymer is then saturated via hydrogenation to produce a corresponding saturated hydrocarbon polymer having the structure of an ethylene-butene LLDPE) with a distribution of dendritic types.

Further to the embodiment described above, the di-lithiated PBd chain is shown below.

(also represented by the following structure below)

The trichlorosilane (TCS) coupling agent is shown below.

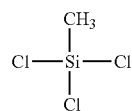

(also represented by the following structure below)

The TCS is used to build up branched structures with the difunctional PBd. One of the Li atoms on the chain will readily react with a Cl atom on the TCS to begin the coupling or linking process:

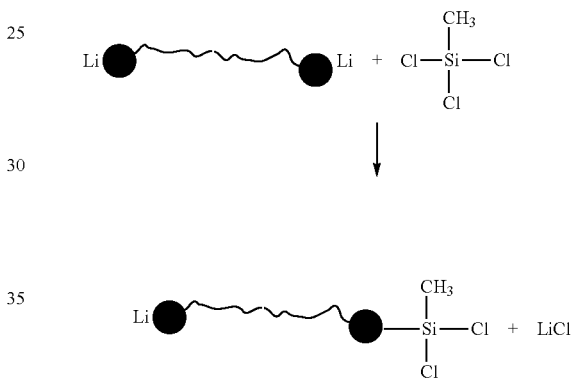

The LiCl is removed from the reaction by stripping or any other means known in the art. This linking can be repeated again and again to build up the branched architecture.

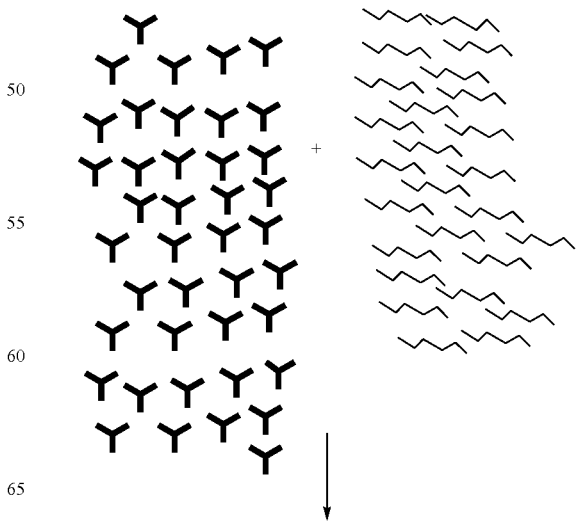

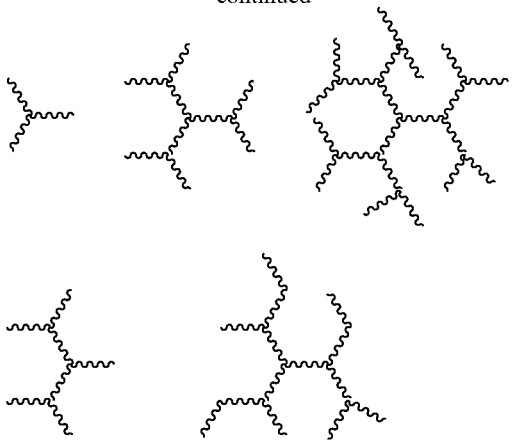

A random linking process typically gives a broad distribution of linked and branched structures, such as those as shown above. The distribution of structures produced depends on the relative stoichiometry of the difunctional PBd (DiPBd) and the TCS as well as the extent of reaction between the Li and Cl. When the reaction is carried out in solution, the primary factor to determine the level of branching is the DiPBd:TCS ratio.

For a first-generation dendritic polymer (three-armed star), the DiPBd:TCS ratio will be 3:1. For a second-generation polymer, the ratio is 9:4. For a third-generation polymer, the ratio is 21:10. For a fourth-generation polymer, the ratio is 45:22. For every symmetrical structure after the first-generation, one has to add two DiPBd chains for every TCS, so as the number of generations approach infinity, the DiPBd:TCS ratio approaches 2:1. When the ratio is smaller, there can be an excess of unreacted Si atoms (even if at least some of the Si in each molecule of TCS have reacted). When the ratio is larger, substantially all chain ends are likely to have Li atoms. The closer the ratio is to 2:1, the larger the average structure size is likely to be. When the ratio is close to 3:1, the average structure will be of first-generation configuration. There will be some proportion of structures larger than that, but there will also be some proportion of structures smaller, particularly DiPBd chains for which both Li atoms are unreacted. As the ratio approaches 1:1, the typical structure is a DiPBd chain with one TCS at an end. In that instance, there will be some proportion of structures larger, but there will also be some proportion of structures with completely unreacted TCS. Thus, to maximize the size and branching of the product polymer, a DiPBd:TCS ratio of 2:1 is desirable.

Another consideration is the molecular weight of the DiPBd chains. Once hydrogenated, the segments need to be longer than the entanglement molecular weight ($M_e$) of polyethylene (1 kg/mol), but if they are very long the viscosity of the polymer may rise too much. A good compromise is to have the $M_w$ (weight average molecular weight) of the chains to be around 5 kg/mol. This also allows a fairly rapid reaction rate in solution to make the random dendritic structures.

By using other dienes, other dendritic saturated hydrocarbon polymers can be produced. As in the case of PBd, the most desired ratio of Di(polydiene):TCS is still 2:1, no matter what the diene is. However, the preferred $M_w$ of the Di(polydiene) will vary according to the variation in the $M_e$ of the saturated product (see "The Influence of Chemical Structure on Polyolefin Melt Rheology and Miscibility", Lohse, D. J. *Journal of Macromolecular Science—Reviews* 2005, 45, 289 or "Chain Dimensions and Entanglement Spacings", Fetters, L. J.; Lohse, D. J.; Colby, R. H.; in *Physical Properties of Polymers Handbook,* 2nd Edition, J. Mark, ed., Springer Verlag, 2007 as a list of how $M_e$ varies with polymer structure). To make a similar set of polymers for dendritic ethylene-propylene copolymers, difunctional polyisoprene can be used.

Then the target $M_w$ of the chains is higher, i.e., 13 kg/mol. If 2-methyl-1,3-pentadiene is used as the diene monomer, then the saturated dendritic polymer will have the structure of an atactic polypropylene, and the target $M_w$ of the chains is 20 kg/mol. If styrene is the monomer used, the saturated dendritic polymer will have a repeat unit of cyclohexyl ethylene, and the target $M_w$ of the chains is 150 kg/mol.

The process uses an olefin monomer(s) as a starting material. Useful olefin monomers take the form of one or more alkenylaromatic hydrocarbons or 1,3-dienes. The alkenylaromatic hydrocarbons or 1,3-dienes can be chosen from the group of unsaturated organic compounds that can be polymerized anionically (i.e., in a reaction initiated by an organoalkali metal). Examples of conjugated diene hydrocarbons include, but are not limited to, 1,3-butadiene, isoprene, 2-methyl-1,3-pentadiene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene. Examples of alkenylaromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and combinations of these, as well as alkyl, cycloalkyl, aryl, alkylaryl and arylalkyl derivatives thereof in which the total number of carbon atoms in the combined hydrocarbon constituents is not greater than 18. Examples of these latter compounds include 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, which is incorporated herein by reference in its entirety, discloses additional useful alkenylaromatic hydrocarbons.

The alkenylaromatic hydrocarbons and 1,3-dienes may be polymerized singly, or in admixture with each other or with other dienes or alkenyl substituted aromatic hydrocarbons to form random or tapered copolymers. Alternately, compounds may be sequentially charged to a reaction mixture to form block copolymers.

Anionic polymerization can be carried out either under vacuum (see N. Hadjichristidis, H. Iatrou, S. Pispas, M. Pitsikalis "Anionic polymerization: High vacuum techniques" *J. Polym Sci A: Polym Chem* 38, 3211 (2000) or under argon (Duward F. Shriver and M. A. Drezdzon "The Manipulation of Air-Sensitive Compounds" 1986, J. Wiley and Sons: New York) using well-known practices. Alkyl hydrocarbon, cyclic (e.g. cyclohexane, cyclopentane) or non-cyclic (e.g. hexane, heptane, octane), as well as aromatic hydrocarbon (e.g. toluene, xylene) can be used as polymerization solvents). If necessary a microstructure modifier can be added.

In the process of the present disclosure, difunctionalized polymers may be reacted with trifunctional linking agents or trifunctionalized polymers may be reacted with difunctional linking agents. The reaction sequence disclosed above was an example of difunctionalized polymers reacted with trifunctional linking agents.

Useful trifunctional coupling agents are disclosed in U.S. Pat. No. 5,360,875, particularly column 2, line 67 through column 3, line 7. U.S. Pat. No. 5,360,875 is incorporated herein in its entirety.

Preferred trifunctional coupling agents are selected from within the structure $X_3Si(CH_2)_nH$ or $X_2(CH_3)_2Si$—$(CH_2)_n$—$Si(CH_3)_2X$, wherein n≥0 and X is a halogen or an alkoxy, including trichloromethylsilane, trichloroethoxysilane, 1-dichloromethyl-2-chlorodimethyl-disiloxane, 1-dichloromethylsilyl-2-chlorodimethylsilyl ethane, and $Cl(CH_3)_2Si$—$(CH_2)_n$—$SiCl(CH_3)$—$(CH_2)_n$—$SiCl(CH_3)_2$, wherein n≥0.

Useful difunctional initiators are disclosed in U.S. Pat. No. 6,221,975, particularly column 3, line 56 through column 4, line 2. U.S. Pat. No. 6,221,975 is incorporated herein in its entirety.

A difunctional initiator can be made available by adding a mono organo-lithium initiator to a reactor in the presence of a non-polar hydrocarbon solvent and a polar additive followed by a slow addition of a divinyl aromatic material.

For the preparation of a difunctional initiator, examples of useful divinyl aromatic materials are 1,3-divinylbenzene, 1,4-divinylbenzene, 1,3-diisopropenylbenzene, 1,3-dipropenylbenzene, 1,4-diisopropenylbenzene, 2,4-diisopropenyltoluene, 2,4-divinyltoluene, 1,3-distyrylbenzene, 1,4-distyrylbenzene, 1,2-distyrylbenzene, 1,3-diisobutenylbenzene, and 1,3-diisopentenylbenzene. A preferred divinyl aromatic material is 1,3-diisopropenylbenzene or 1,3-bis(1-phenylethenyl)benzene.

The difunctional initiators 1,3-bis(1-phenyl-3-methylpentyl lithium)benzene or 1,3-bis(1,3-dimethylpentyl lithium) benzene can be made by reacting an organo mono-lithium compound, for instance an alkyllithium such as sec-butyllithium, with 1,3-bis(isoprenyl)benzene or 1,3-bis(1-phenylethenyl)benzene. Additionally, difunctional initiators can be produced by reacting polyalkydienyl lithium or polyalkenylaromatic lithium or lithium terminated copolymers of alkydienes and alkenylaromatics with 1,3-bis(isoprenyl)benzene or 1,3-bis(1-phenylethenyl)benzene.

Other useful difunctional initiators are disclosed in European Patent 0673954 B1, which is incorporated herein by reference. European Patent 0673954 B1 discloses at page 2, line 26 through page 3, line 47 teachings from column 14 of U.S. Pat. No. 4,200,718. U.S. Pat. No. 4,200,718 describes the compound corresponding to the formula:

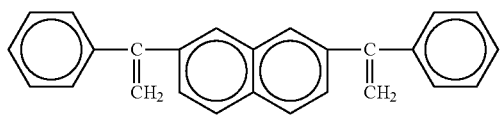

which is reacted with secondary butyllithium to prepare [2,7-naphthalenediylbis(3-methyl-1-phenylpentylidene]-bis (lithium), an initiator used for the anionic polymerization of butadiene.

Polymer International, 29(3), pp. 195-199 (1992) describes the preparation of 1,5-diethenylnaphthalene and reaction thereof with secondary butyllithium in n-heptane, in the absence of any polar additive, thereby producing 1,5-bis (1-lithio-3-methylpentyl)naphthalene. This compound was isolated and soluble monofunctional compounds removed. When dissolved in benzene (solubility: $3.2 \times 10^{-2}$ mole/liter), it was used as an initiator for the sequenced copolymerization of isoprene and styrene. 1,5-bis(1-lithio-3-methylpentyl) naphthalene is a useful initiator.

Other useful initiators can made by reacting an organo mono-lithium compound, for instance an alkyllithium such as sec-butyllithium, with the compound of formula (I)

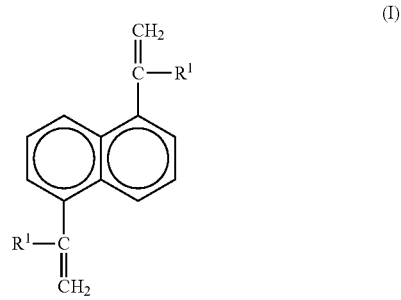

(I)

in which $R^1$ is a linear, branched, or cyclic alkyl radical having from 1 to 12 carbon atoms, or a substituted or unsubstituted aryl radical. The alkyl radicals $R^1$ are preferably methyl radicals; the aryl radicals $R^1$ are preferably phenyl radicals.

Moreover, the polymerization is preferably conducted in the presence of a polar compound that reduces the associations between the zwitterionic pairs at the end of each growing chain, thus promoting the polymerization. The preferred polar compounds are those which do not significantly increase the fraction of the butadiene monomers that add as 1,2 (vinyl) repeat units. Examples of such polar compounds include lithium alkoxides such as lithium butoxide and lithium t-amyl oxide, and n-aliphatic triamines such as N,N, N',N",N"-pentamethyl diethylene triamine.

The process of the present disclosure can also be carried out using a trifunctional initiator and a difunctional coupling agent.

Another embodiment of the present disclosure is the production of a dendritic polymer from polybutadiene (PBd). Tri-functionalized PBd is produced from butadiene monomer in the presence of a trifunctional initiator. During polymerization, the polymer chain extends out in all three directions ultimately resulting in a tri-lithiated chain, with Li atoms at all three ends. The tri-functionalized PBd is reacted with a difunctional coupling agent, $SiCl_2(CH_3)_2$ (dichlorosilane or DCS), to couple functionalized chain ends to make a dendritic polymer. The dendritic polymer is then saturated via hydrogenation to produce a corresponding saturated hydrocarbon polymer having the structure of an ethylene-butene LLDPE) with a distribution of dendritic types.

Further to the embodiment described above, the tri-lithiated PBd chain is shown below.

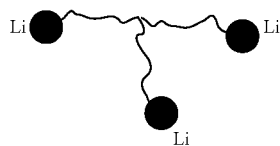

(also represented by the following)

The dichlorosilane (DCS) coupling agent is shown below.

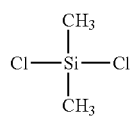

(also represented by the following) —

The DCS is used to build up branched structures with the trifunctional PBd. One of the Li atoms on the chain will readily react with a Cl atom on the DCS to begin the coupling or linking process. The LiCl is removed from the reaction by stripping or any other means known in the art. This linking can be repeated again and again to build up the branched architecture:

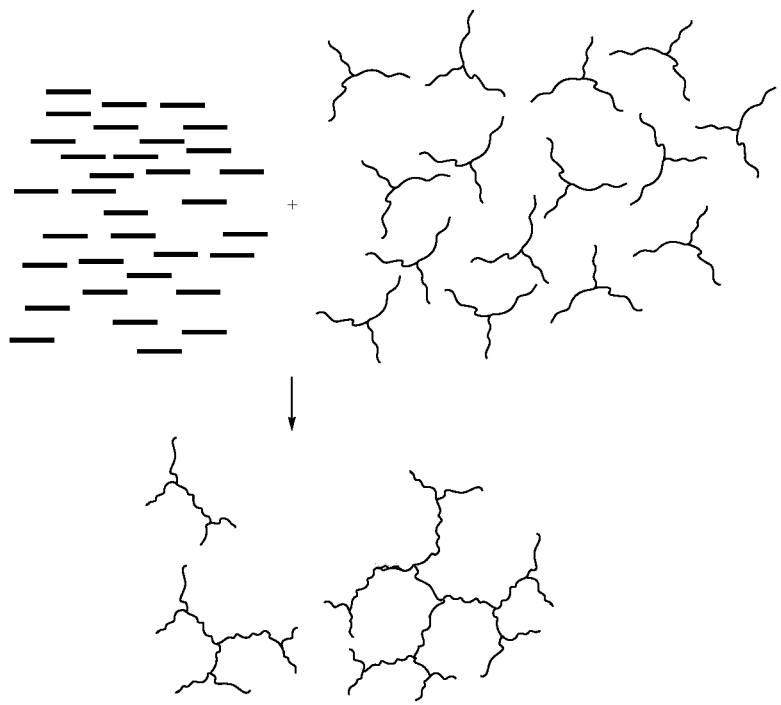

A random linking process typically gives a broad distribution of linked and branched structures, such as those as shown above. The distribution of structures produced depends on the relative stoichiometry of the trifunctional PBd (TriPBd) and the DCS as well as the extent of reaction between the Li and Cl. When the reaction is carried out in solution, the primary factor to determine the level of branching is the TriPBd:DCS ratio.

The first-generation dendritic polymer (three-armed star), is a TriPBD. For a second-generation polymer, the TriPBd:DCS ratio is 4:3. For a third-generation polymer, the ratio is 10:9. For a fourth-generation polymer, the ratio is 22:21. For every symmetrical structure after the first-generation, there is one additional TriPBd molecule for every DCS, so as the number of generations approach infinity, the DiPBd:TCS ratio approaches 1:1. When the ratio is smaller, there can be an excess of unreacted Si atoms (even if at least some of the Si in each molecule of DCS have reacted). When the ratio is larger, substantially all chain ends are likely to have Li atoms. The closer the ratio is to 1:1, the larger the average structure size is likely to be. When the ratio is much larger than 1:1, the average structure will be of first-generation configuration. There will be some proportion of structures larger than that, but there will also be some proportion of structures smaller, particularly TriPBd chains for which all three Li atoms are unreacted. As the ratio is well below 1:1, the typical structure is a TriPBd chain with one DCS at each end. In that instance, there will be some proportion of structures larger, but there will also be some proportion of structures with completely unreacted DCS. Thus, to maximize the size and branching of the product polymer, a TriPBd:DCS ratio of 1:1 is desirable.

Another consideration is the molecular weight of the TriPBd chains. Once hydrogenated, the segments need to be longer than the entanglement molecular weight ($M_e$) of polyethylene (1 kg/mol), but if they are very long the viscosity of the polymer may become too high. A good compromise is to have the $M_w$ (weight average molecular weight) of each arm of the TriPBD be around 2.5 kg/mol, or, equivalently, to have the $M_w$ of the TriPBD be around 7.5 kg/mol. This also affords a fairly rapid reaction rate in solution in making the random dendritic structures.

As in the case of DiPBd/TCS, other dienes and alkenylaromatic monomers can be used. The same list given above applies for this case as well. The most desired ratio of Tri(polydiene):DCS is still 1:1, no matter what the monomer is. The preferred $M_w$ of the Tri(polydiene) will vary according to the variation in the $M_e$ of the saturated product in the same manner as described above.

Useful difunctional coupling agents include compounds within the formula $X_2Si\{(CH_2)_nH\}_2$ or $X(CH_3)_2Si—(CH_2)_n—Si(CH_3)_2X$, wherein n>=0 and X is a halogen or an alkoxy, including dichlorodimethylsilane, dichlorodiethoxysilane, and 1,2 bis(dimethylchloro)ethane.

Useful trifunctional initiators are disclosed in U.S. Pat. No. 3,954,894, particularly col. 1 line 48 through col. 3, line 24. U.S. Pat. No. 3,954,894 is incorporated herein in its entirety.

Organotrilithium initiator compounds can be made by mono-adducting a disubstituted vinylic aromatic compound, for instance, a divinyl benzene or a diisopropenyl benzene, with an organo mono-lithium compound, for instance, an alkyllithium such as sec-butyllithium, to form a mono-adduct. The mono-adduct is then reacted with an organodilithium compound to form the desired organotrilithium compound in solution. Alternatively, but less preferably, the disubstituted vinylic aromatic compound can be mono-adducted with the organodilithium compound and the resulting mono-adduct is then reacted with the alkyllithium.

In the preparation of the initial mono-adduct, various disubstituted vinylic aromatic compounds can be utilized, illustrative of which are 1,3-divinylbenzene; 1,4-divinylbenzene; 1,3-dipropenylbenzene; 1,3-diisopropenylbenzene; 1,4-diisopropenylbenzene; 2,4-diisopropenyltoluene; 2,4-divinyltoluene; the various divinylnaphthalenes; the various diisopropenylnaphthalenes; 1,3-distyrylbenzene; 1,4-distyrylbenzene; 1,2-distyrylbenzene; 1,3-diisobutenylbenzene; and 1,3-diisopentenylbenzene.

The alkyllithium compounds used to prepare the monoorganolithium-divinyl- or diisopropenyl aromatic mono-adducts are generally in the $C_2$ to $C_{12}$ range and include, for example, ethyllithium, n-propyllithium, isopropyllithium, n-butyllithium, isobutyllithium, sec-butyllithium, tert-butyllithium, n-amyllithium, isoamyllithium, sec-amyllithium, and tert-amyllithium. Of especially and preferred utility are secondary and tertiary alkyllithium compounds, such as isopropyllithium, sec-butyllithium, tert-butyllithium, sec-amyllithium, and tert-amyllithium. Substituted alkyllithiums can also be used, such as aralkyllithium compounds, as, for example, benzyllithium, 1-lithioethylbenzene, and 1-lithio-3-methylpentylbenzene.

Organodilithium compounds employed in the production of organotrilithium compounds include, by way of illustration and among others, 1,3- and 1,4-bis-(1-lithio-3methyl-pentyl)benzene, 1,3- and 1,4-bis-(1-lithio-1,3-dimethylpentyl)benzene, dilithio dimers of conjugated dienes, and α,ω-dilithioalkanes. Useful dilithio dimers of conjugated dienes include isoprene, 1,4-hexadiene, 1,3-butadiene, 2,5-dimethyl-2,5-hexadiene, 2,3-dimethyl-1,3-butadiene, 1,3-pentadiene (piperylene), and 2-methyl-3-ethyl-1,3-butadiene. Useful α,ω-dilithioalkanes include 1,4-dilithiobutane and 1,5-dilithiopentane.

Hydrocarbon solvent media typically employed in making organotrilithium compounds include liquid alkanes and cycloalkanes, such as n-pentane, n-hexane, n-heptane and cyclohexane, and normally liquid aromatic hydrocarbons, such as benzene, toluene, xylene, ethylbenzene and pseudocumene, and mixtures of thereof. The concentration range of the organotrilithium as prepared in solution can be varied widely, with solutions containing between 0.5 and 2 equivalents of C—Li per liter being most desirable.

Reaction temperatures utilized in the production of trilithium initiators are variable but, generally speaking, low temperatures are used, usually in the range of −60° C. to not substantially in excess of ambient temperatures, particularly desirably being temperatures in the range of −30° C. to 0° C. In carrying out the initial preparation of a mono-adduct, for instance, from a disubstituted vinylic aromatic hydrocarbon and an alkyllithium, compound, the reaction medium may or may not include tertiary amines, notably monoamines. In the production of the organodilithium compound, and also in the subsequent step of reacting the mono-adduct with the organodilithium compound, tertiary amines should be present. The proportions of such amines, when utilized, can vary. Thus, it is desirable that said amines be present in proportions in a molar ratio range, based on C—Li, of 0.5 to 1 to 4 to 1. A range of 1 to 1 is most preferred. Triethylamine is especially satisfactory but various other tertiary amines, particularly monoamines, can also be used. Such tertiary amines include trimethylamine, tri-n-propylamine, triisopropylamine, ethyl di-n-propylamine, diethyl-n-butylamine, triisobutylamine, TMEDA, and arylalkyl tertiary amines. Arylalkyl tertiary amines include dimethylaniline, diethylaniline, diisopropylaniline and methylisobutylaniline.

The mono addition of an alkyllithium compound to a divinyl-substituted aromatic compound, for example, can be controlled to give exclusively or substantially a mono adduct while leaving intact one unreacted vinyl grouping, which is then reacted with an organodilithium compound to yield hydrocarbon-soluble trifunctional initiators. Thus, the addition of 1 molar equivalent of 1,3-diisopropenylbenzene to sec-butyllithium in hexane solution yields the following mono-adduct:

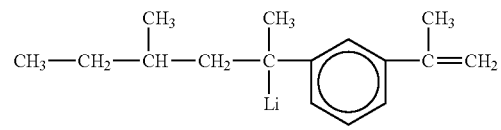

Then an organodilithium compound such as bis-(1-lithio-1,3-dimethylpentyl)benzene (formed by the addition of 1,3-diisopropenylbenzene to 2 molar equivalents of sec-butyl lithium) can be added to the above mono-adduct solution to yield the following organotrilithium compound:

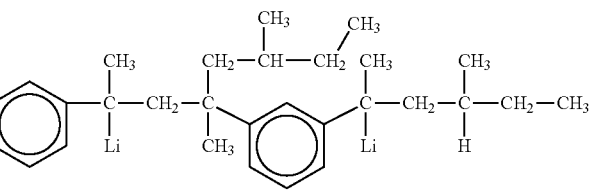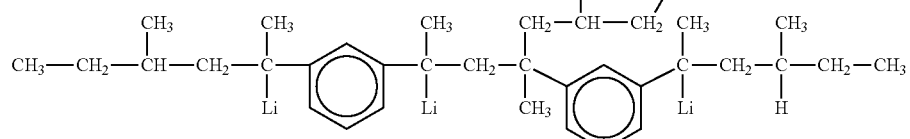

Suitable vinylbenzenes include 1,3-divinylbenzene, 1,3-diisopropenylbenzene, 1,3,5-trivinylbenzene and 1,3,5-triisopropenylbenzene. Besides the pure compounds, technical mixtures thereof may also be used. For example, the technical mixture of divinylbenzene can be a mixture of 1,3-, 1,4- and 1,2-divinylbenzene. Moreover, vinylbenzenes and isopropenylbenzenes may be used in admixture with one another. Particularly, 1,3-diisopropenylbenzene and 1,3,5-triisopropenyl-benzene may be used.

Additional teachings to useful di- and tri-organolithium initiators are seen at U.S. Pat. No. 4,311,818 and PCT Application No. WO/2002/008300, both of which are incorporated by reference herein in their entirety.

Hydrogenation can be carried out in the process of the present disclosure by any known catalysis system, including heterogeneous systems and soluble systems. Soluble systems are disclosed in U.S. Pat. No. 4,284,835 at column 1, line 65 through column 9, line 16 as well as U.S. Pat. No. 4,980,331 at column 3 line 40 through column 6, line 28.

For purposes of the present disclosure, "substantially saturated" as it refers to the dendritic hydrocarbon polymer means that polymer includes on average fewer than 10 double bonds, or fewer than 5 double bonds, or fewer than 3 double bonds, or fewer than 1 double bond per hydrocarbon polymer chain.

Additional teachings to hydrogenation are seen in Rachapudy et al., Journal of Polymer Science: Polymer Physics Edition, Vol. 17, 1211-1222 (1979), which is incorporated herein by reference in its entirety. Table 1 of the article discloses several systems including palladium on various supports (calcium carbonate, but also barium sulfide). The Rachapudy et al. article discloses preparation of homogeneous catalysts and heterogeneous catalysts.

The Rachapudy et al. article discloses a method of preparation of a homogeneous catalyst. The catalyst can be formed by reaction between a metal alkyl and the organic salt of a transition metal. The metal alkyls were n-butyl lithium (in cyclohexane) and triethyl aluminum (in hexane). The metal salts were cobalt and nickel 2-ethyl hexanoates (in hydrocarbon solvents) and platinum and palladium acetyl-acetonates (solids). Hydrogenation was conducted in a 1-liter heavy-wall glass reactor, fitted with a stainless steel flange top and magnetically stirred. A solution of 5 grams of polybutadiene in 500 ml of dry cyclohexane was added, and the reactor was closed and purged with nitrogen. The catalyst complex was prepared separately by adding the transition metal salt to the metal alkyl in cyclohexane under nitrogen. The molar ratio of component metals (alkyl to salt) was generally 3.5/1, the optimum in terms of rate and completeness of hydrogenation. The reactor was heated to 70° C., purged with hydrogen, and the catalyst mixture (usually 0.03 moles of transition metal per mole of double bonds) injected through a rubber septum. Hydrogen pressure was increased to 20 psi (gauge) and the reaction allowed to proceed for approximately 4 hours. Hydrogenation proceeds satisfactorily in the initial stages even at room temperature, but the partially hydrogenated polymer soon begins to crystallize. At 70° C., the polymer remains in solution throughout the reaction.

After hydrogenation the catalyst was decomposed with dilute HCl. The polymer was precipitated with methanol, washed with dilute acid, re-dissolved, re-precipitated and dried under vacuum. Blank experiments with polyethylene in place of polybutadiene confirmed that the washing procedure was sufficient to remove any uncombined catalyst decomposition products.

The Rachapudy et al. article also discloses a method of preparation of a heterogeneous catalyst. A 1-liter high-pressure reactor (Parr Instrument Co.) was used. The catalysts were nickel on kieselguhr (Girdler Co.) and palladium on calcium carbonate (Strem Chemical Co.). Approximately 5 grams of polybutadiene were dissolved in 500 ml of dry cyclohexane, the catalyst was added (approximately 0.01 moles metal/mole of double bonds), and the reactor was purged with hydrogen. The reactor was then pressurized with hydrogen and the temperature raised to the reaction temperature for 3 to 4 hours. For the nickel catalyst, the reaction conditions were 700 psi $H_2$ and 160° C. For palladium, the conditions were 500 psi $H_2$ and 70° C.

After reaction the hydrogen was removed and the solution filtered at 70° C. The polymer was precipitated with methanol and dried under vacuum.

Additional teachings to hydrogenation processes and catalysts therefor are disclosed in U.S. Pat. Nos. 4,284,835 and 4,980,331, both of which are incorporated herein by reference in their entirety.

The catalysts described herein can be used to hydrogenate hydrocarbons containing unsaturated carbon bonds. The unsaturated carbon bonds which may be hydrogenated include olefinic and acetylenic unsaturated bonds. The process is particularly suitable for the hydrogenation under mild conditions of hydrogenatable organic materials having carbon-to-carbon unsaturation, such as acyclic monoolefins and polyolefins, cyclic monoolefins and polyolefins and mixtures thereof. These materials may be unsubstituted or substituted with additional non-reactive functional groups such as halogens, ether linkages or cyano groups. Exemplary of the types of carbon-to-carbon compounds useful herein are hydrocarbons of 2 to 30 carbon atoms, e.g., olefinic compounds selected from acyclic and cyclic mono-, di- and triolefins. The catalysts of this disclosure are also suitable for hydrogenating carbon-to-carbon unsaturation in polymeric materials, for example, in removing unsaturation from butadiene polymers and co-polymers such as styrene-butadiene-styrene.

The hydrogenation reaction herein is normally accomplished at a temperature from 40° C. to 160° C. and preferably from 60° C. to 150° C. Different substrates being hydrogenated will require different optimum temperatures, which can be determined by experimentation. The initial hydrogenation pressures may range up to 3,000 psi partial pressure, at least part of which is present due to the hydrogen. Pressures from 1 to 7500 psig are suitable. Preferred pressures are up to 2000 psig, and most preferred pressures are from 100 to 1000 psig are employed. The reactive conditions are determined by the particular choices of reactants and catalysts. The process may be either batch or continuous. In a batch process, reaction times may vary widely, such as between 0.01 second to 10 hours. In a continuous process, reaction times may vary from 0.1 seconds to 120 minutes and preferably from 0.1 second to 10 minutes.

The ratio of catalyst to material being hydrogenated is generally not critical and may vary widely within the scope of the disclosure. Molar ratios of catalyst to material being hydrogenated between 1:1000 and 10:1 are found to be satisfactory; higher and lower ratios, however, are possible.

If desired, the hydrogenation process may be carried out in the presence of an inert diluent, for example a paraffinic or cycloparaffinic hydrocarbon.

Additional teachings to hydrogenation processes and catalysts therefor are disclosed in U.S. Pat. No. 4,980,331, which is incorporated herein by reference in its entirety.

In general, any of the Group VIII metal compounds known to be useful in the preparation of catalysts for the hydrogenation of ethylenic unsaturation can be used separately or in combination to prepare the catalysts. Suitable compounds, then, include Group VIII metal carboxylates having the formula $(RCOO)_nM$, wherein M is a Group VIII metal, R is a hydrocarbyl radical having from 1 to 50 carbon atoms, preferably from 5 to 30 carbon atoms, and n is a number equal to the valence of the metal M; alkoxides having the formula $(RCO)_nM$, wherein M is again a Group VIII metal, R is a hydrocarbon radical having from 1 to 50 carbon atoms, preferably from 5 to 30 carbon atoms, and n is a number equal to the valence of the metal M; chelates of the metal prepared with beta-ketones, alpha-hydroxycarboxylic acids beta-hydroxycarboxylic acids, beta-hydroxycarbonyl compounds and the like; salts of sulfur-containing acids having the general formula $M(SO_x)_n$ and partial esters thereof; and salts of aliphatic and aromatic sulfonic acids having from 1 to 20 carbon atoms. Preferably, the Group VIII metal will be selected from the group consisting of nickel and cobalt. Most preferably, the Group VIII metal will be nickel. The metal carboxylates useful in preparing the catalyst include Group VIII metal salts of hydrocarbon aliphatic acids, hydrocarbon cycloaliphatic acids and hydrocarbon aromatic acids. Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, and rhodinic acid. Examples of hydrocarbon aromatic acids include benzoic acid and alkyl-substituted aromatic acids in which the alkyl substitution has from 1 to 20 carbon atoms. Examples of cycloaliphatic acids include naphthenic acid, cyclohexylcarboxylic acid, and abietic-type resin acids. Suitable chelating agents which may be combined with various Group VIII metal compounds thereby yielding a Group VIII metal chelate compound useful in the preparation of the catalyst include beta-ketones, alpha-hydroxycarboxylic acids, beta-hydroxy carboxylic acids, and beta-hydroxycarbonyl compounds. Examples of beta-ketones that may be used include acetylacetone, 1,3-hexanedione, 3,5-nonadione, methylacetoacetate, and ethylacetoacetate. Examples of alpha-hydroxycarboxylic acids that may be used include lactic acid, glycolic acid, alpha-hydroxyphenylacetic acid, alpha-hydroxy-alpha-phenylacetic acid, and alpha-hydroxycyclohexylacetic acid. Examples of beta-hydroxycarboxylic acids include salicylic acid, and alkyl-substituted salicyclic acids. Examples of beta-hydroxylcarbonyl compounds that may be used include salicylaldehyde, and θ-hydroxyacetophenone. The metal alkoxides useful in preparing the catalysts include Group VIII metal alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, and dodecanol. The Group VIII metal salts of sulfur-containing acids and partial esters thereof include Group VIII metal salts of sulfonic acid, sulfuric acid, sulphurous acid, and partial esters thereof. Of the sulfonic acids, aromatic sulfonic acids such as benzene sulfonic acid, p-toluene sulfonic acid, are particularly useful.

In general, any of the alkylalumoxane compounds known to be useful in the preparation of olefin polymerization catalysts may be used in the preparation of the hydrogenation catalyst. Alkylalumoxane compounds useful in preparing the catalyst may, then, be cyclic or linear. Cyclic alkylalumoxanes may be represented by the general formula $(R-Al-O)_m$ while linear alkylalumoxanes may be represented by the general formula $R(R-Al-O)_nAlR_2$. In both of the general formulae R will be an alkyl group having from 1 to 8 carbon atoms such as, for example, methyl, ethyl, propyl, butyl, and pentyl, m is an integer from 3 to 40, and n is an integer from 1 to 40. In a preferred embodiment, R will be methyl, m will be a number from 5 to 20 and n will be a number from 10 to 20. As is well known, alkylalumoxanes may be prepared by reacting an aluminum alkyl with water. Usually the resulting product will be a mixture of both linear and cyclic compounds.

Contacting of the aluminum alkyl and water may be accomplished in several ways. For example, the aluminum alkyl may first be dissolved in a suitable solvent such as toluene or an aliphatic hydrocarbon and the solution then contacted with a similar solvent containing relatively minor amounts of moisture. Alternatively, an aluminum alkyl may be contacted with a hydrated salt, such as hydrated copper sulfate or ferrous sulfate. When this method is used, a hydrated ferrous sulfate is frequently used. According to this method, a dilute solution of aluminum alkyl in a suitable solvent such as toluene is contacted with hydrated ferrous sulfate. In general, 1 mole of hydrated ferrous sulfate will be contacted with from 6 to 7 moles of the aluminum trialkyl. When aluminum trimethyl is the aluminum alkyl actually used, methane will be evolved as conversion of the aluminum alkyl to an alkylalumoxane occurs.

In general, any of the Group Ia, IIa or IIIa metal alkyls or hydrides known to be useful in preparing hydrogenation catalysts in the prior art may be used to prepare the catalyst. In general, the Group Ia, IIa or IIIa metal alkyls will be peralkyls with each alkyl group being the same or different containing from 1 to 8 carbon atoms and the hydrides will be perhydrides although alkylhydrides should be equally useful. Aluminum, magnesium and lithium alkyls and hydrides are particularly useful and these compounds are preferred for use in preparing the catalyst. Aluminum trialkyls are most preferred.

The one or more alkylalumoxanes and the one or more Group Ia, IIa or IIIa metal alkyls or hydrides may be combined and then contacted with the one or more Group VIII metal compounds or the one or more alkylalumoxanes and the one or more Group Ia, IIa or IIIa metal alkyls or hydrides may be sequentially contacted with the one or more Group VIII metal compounds with the proviso that when sequential contacting is used, the one or more alkylalumoxanes will be first contacted with the one or more Group VIII metal compounds. Sequential contacting is preferred. With respect to the contacting step the two different reducing agents; i.e., the alkylalumoxanes and the alkyls or hydrides, might react with the Group VIII metal compound in such a way as to yield different reaction products. The Group Ia, IIa and IIIa metal alkyls and hydrides are a stronger reducing agent than the alkylalumoxanes, and, as a result, if the Group VIII metal is allowed to be completely reduced with a Group Ia, IIa or IIIa metal alkyl or hydride, the alkylalumoxanes might make little or no contribution. If the Group VIII metal is first reduced with one or more alkylalumoxanes however, the reaction product obtained with the alumoxane might be further reduced or otherwise altered by reaction with a Group Ia, IIa or IIIa metal alkyl or hydride. Whether contacting is accomplished concurrently or sequentially, the one or more alkylalumoxanes will be combined with the one or more Group VIII metal compounds at a concentration sufficient to provide an aluminum to Group VIII metal atomic ratio within the range from 1.5:1 to.20:1 and the one or more Group Ia, IIa or IIIa metal alkyls or hydrides will be combined with one or more Group VIII metal compounds at a concentration sufficient to provide a Group Ia, IIa or IIIa metal to Group VIII metal atomic ratio within the range from 0.1:1 to 20:1. Contact between the one or more Group VIII compounds and the one or more alkylalumoxanes and the one or more alkyls or hydrides will be accomplished at a temperature within the range from 20° C. and 100° C. Contact will typically be continued for a period of time within the range from 1 to 120 minutes. When sequential contacting is used, each of the two contacting steps will be continued for a period of time within this same range.

In general, the hydrogenation catalyst will be prepared by combining the one or more Group VIII metal compounds with the one or more alkylalumoxanes and the one or more Group Ia, IIa or IIIa metal alkyls or hydrides in a suitable solvent. In general, the solvent used for preparing the catalyst may be anyone of those solvents known in the prior art to be useful as solvents for unsaturated hydrocarbon polymers. Suitable solvents include aliphatic hydrocarbons, such as hexane, heptane, and octane, cycloaliphatic hydrocarbons such as cyclopentane, and cyclohexane, alkyl-substituted cycloaliphatic hydrocarbons such as methylcyclopentane, methylcyclohexane, and methylcyclooctane, aromatic hydrocarbons such as benzene, hydroaromatic hydrocarbons such as decalin and tetralin, alkyl-substituted aromatic hydrocarbons such as toluene and xylene, halogenated aromatic hydrocarbons such as chlorobenzene, and linear and cyclic ethers such as the various dialkyl ethers, polyethers, particularly diethers, and tetrahydrofuran. Suitable hydrogenation catalysts will usually be prepared by combining the catalyst components in a separate vessel prior to feeding the same to the hydrogenation reactor.

The following are examples of the present disclosure and are not to be construed as limiting.

EXAMPLES

Example 1

Synthesis of the dilithium initiator: 1,3-bis(1-phenyl-3-methylpentyllithium)benzene.

The difunctional initiator 1,3-bis(1-phenyl-3-methylpentyllithium)benzene (DLi) was made by reacting sec-butyllithium with 1,3-bis(1-phenyletheny)benzene (PEB), according to the following:

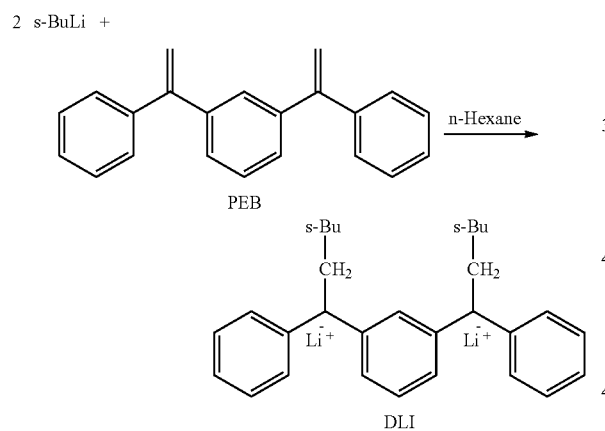

The purification of all compounds to the standards of anionic polymerization, as well as the synthesis of the dilithium initiator, was realized under high vacuum conditions using well-known high vacuum techniques as described in Journal of Polymer Science-Polymer Chemistry edition, volume 38, issue 18, pages 3211-3234 (2000). A small excess of sec-BuLi over PEB (10% excess s-BuLi) is usually used in order to ensure that all the double bonds of PEB have been reacted. The reaction is left to progress for three or four days. Both PEB and sec-BuLi are soluble in n-hexane. After some hours starts the formation of suspension which corresponds to the desirable product (DLi) which is insoluble in n-hexane. Excess of s-BuLi or any mono-adduct byproduct (one double bond of PEB has remained unreacted) are soluble in n-hexane and removed under vacuum conditions through a flask-trap. A sparing solubility of DLi gives the hexane a deep red color, but this minimal loss of DLi is unimportant.

After the detachment (seal-off) of the constriction that connects the flask-trap with the main reactor, only DLi remained. Benzene was then distilled to the main reactor of the apparatus and apparatus detached from the vacuum line.

The solution (DLi in benzene) was collected through a filter and attached to the final apparatus equipped with calibrated ampoules. The initiator solution was stored in a freezer until use. Polymerization of isoprene in the presence of sec-butoxide lithium was performed in order to determine the title of the solution.

Example 2

Synthesis of Dilithium Polybutadiene

The dilithium PBd was prepared by polymerization of butadiene (Scheme 2) with the dilithium initiator in a benzene solution in the presence of sec-butoxide lithium, which accelerates polymerization but does not impact the desired 1,4 microstructure of PB. Reactions for the synthesis of the dilithium PBd and the dendritic PBd.

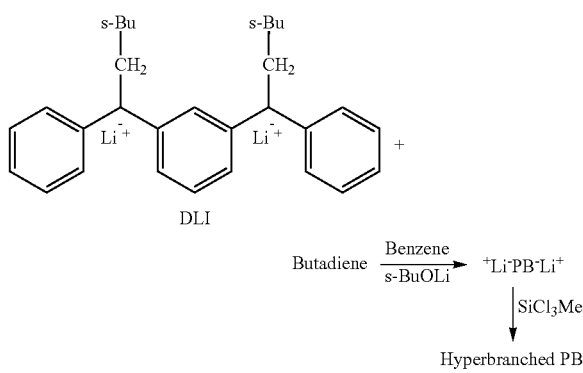

Two different experimental methods were employed for the synthesis of the dendritic PBds. In the first method (method A) the solution of SiCl$_3$Me (TCS) was added slowly to the living difunctional polymer. In the second method (method B), both polybutadienyl dilithium and silane were mixed together (simultaneously) and left to react. In both experiments, DLi and Silane used in 1\1 molecular ratio thus means 2 Li with 3 Cl.

Example 3

Figure 2:
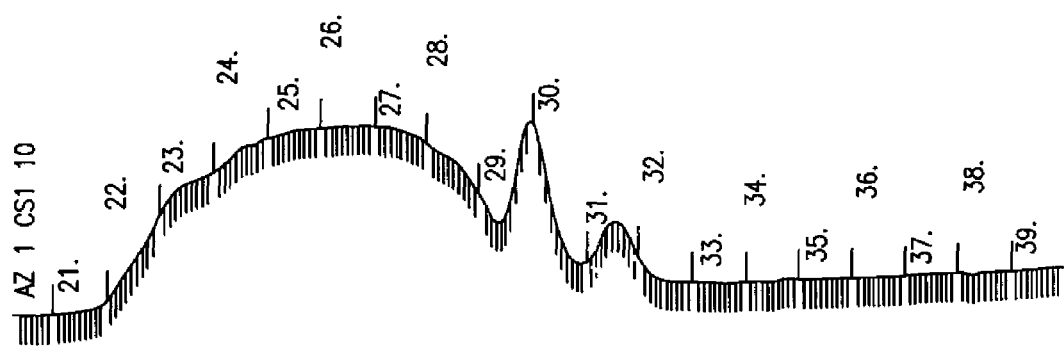
FIG. 2 is a GPC plot of the final product in Example 3.

Method A 14.7 ml DLi (0.00113 mol), 7.1 ml butadiene (5.183 g) and 7.0 ml s-BuOLi (0.00882 mol) [s-BuOLi]/[C—Li]=4/1) were left to react in a benzene solution 10% w.v in butadiene for 5-6 days. An aliquot of the living PBLi2 was used to determine both the molecular weight Mw and the molecular weight distribution I in a GPC apparatus with THF as the mobile phase calibrated with PS standards. The PBd molecular weight was determined from PS standards while making necessary corrections. (Mw: 16K; molecular weight distribution: I≤1,1.) After the polymerization of PBLi$_2$ the solution had a yellow color. Afterwards, the slow addition (two hours) of the silane took place to the benzene solution of PBLi$_2$ (2% w.v). This low concentration was chosen in order to avoid the formation of gel as insoluble networks may develop. During the addition of the silane, aliquots were taken in order to monitor the progress of the linking reaction. After three hours, the reaction appeared to be essentially complete. New addition of silane had no effect on the progress of the reaction. The GPC traces of the initial dilithium PBd before and after the addition of the TCS final product are shown in FIGS. 1 and 2.

Example 4

Method B

Figure 3:
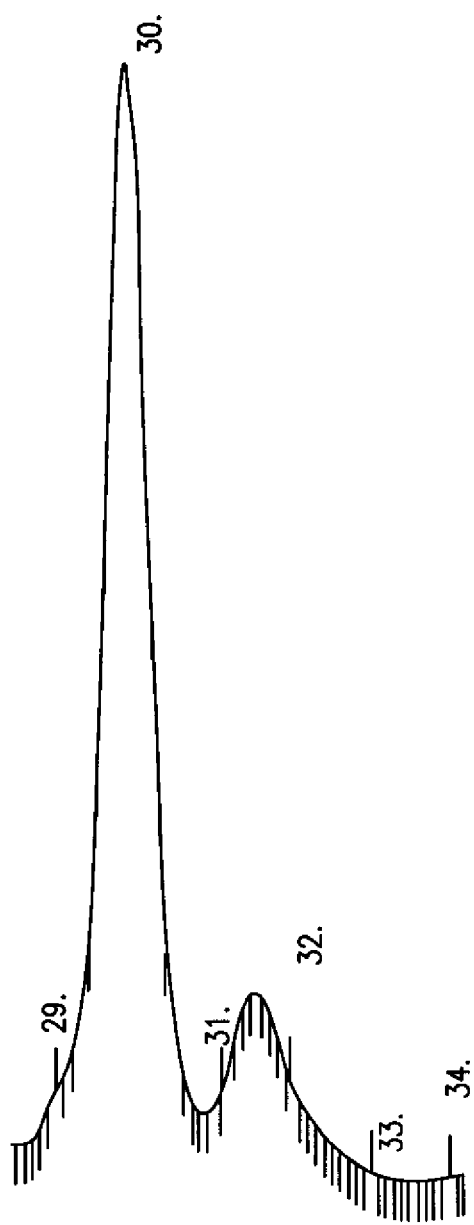
FIG. 3 is a GPC plot of dilithium PBd before the addition of TCS in Example 4.
Figure 4:
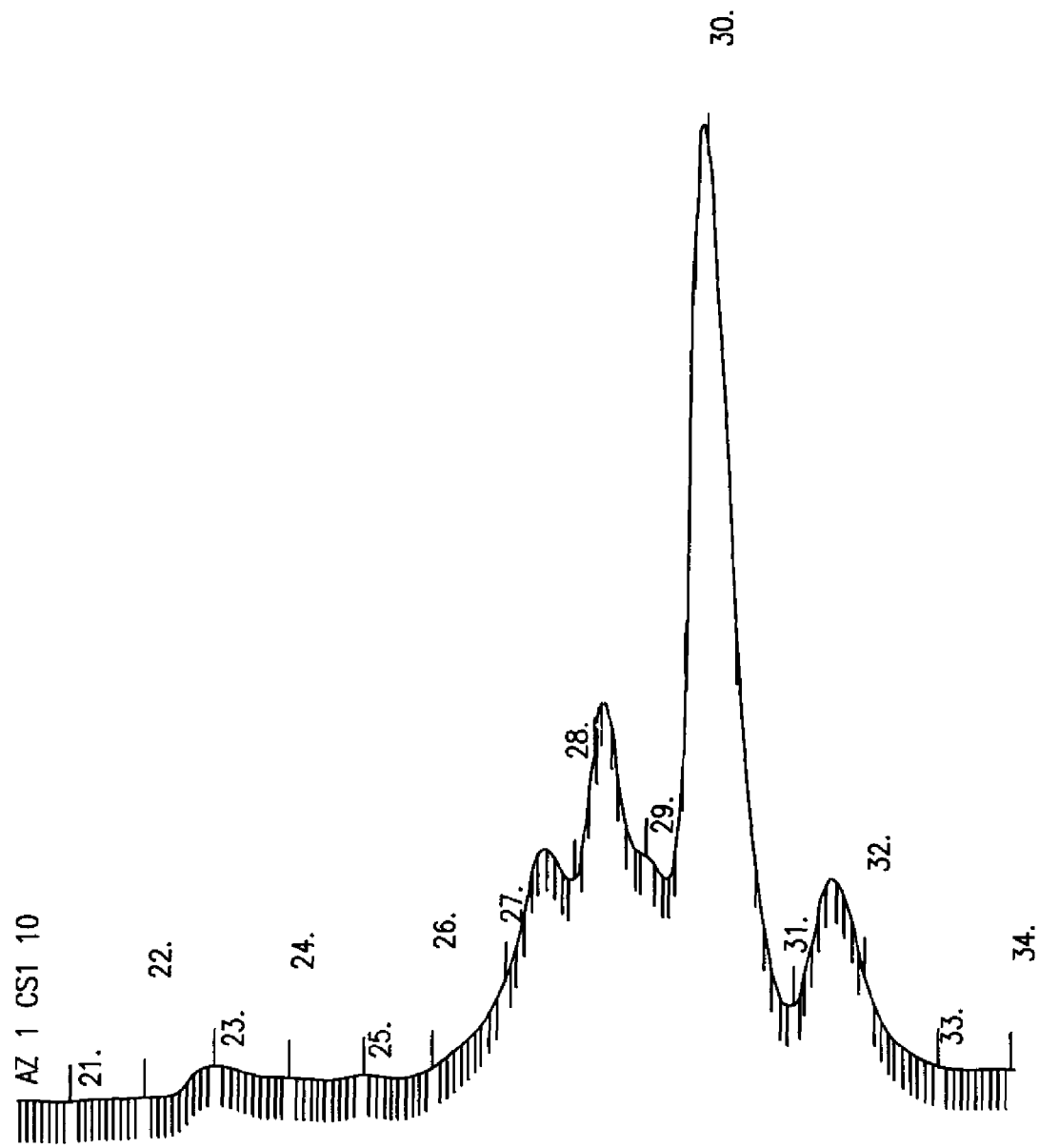
FIG. 4 is a GPC plot of the final product in Example 4.

Substantially the same procedure was followed and the same quantities used in Example 3 except that both silane and polybutadienyl dilithium were mixed simultaneously and left to react. The yellow color of the PBLi$_2$ solution changed rapidly to a colorless solution because of the rapid termination of the living anionic sites with the Cl groups of the silane. The reaction was substantially complete in 3 or 4 hours, indicative of a very fast reaction. No gel was formed. Isomerism phenomena (colored solution) did not appear indicating that after some hours, there were not any living anionic sites in the solution. The GPC traces of the dilithium PBd before and after mixing with TCS are shown in FIGS. 3 and 4.

Example 5

Polymerization P1

Polymerization of Butadiene

DLI was left to react with Bd for 4-5 days in a benzene solution (6% w/v) in monomer at room temperature in the presence of s-BuOLi in molar ratio [s-BuOLi/C—Li=5/1]. By SEC in THF it was found that $M_w/M_n<1.1$, $M_w\sim15$ kg/mol.

Polycondensation

Trichloromethylsilane (molar ratio 1/1 to living polymer) was added drop wise to a polybutadienedilithium benzene solution 2% w/v in polymer. The reaction was monitored in a GPC apparatus with THF as the mobile phase calibrated with PS standards. It was found that $M_w/M_n\sim2.0$.

Figure 5:
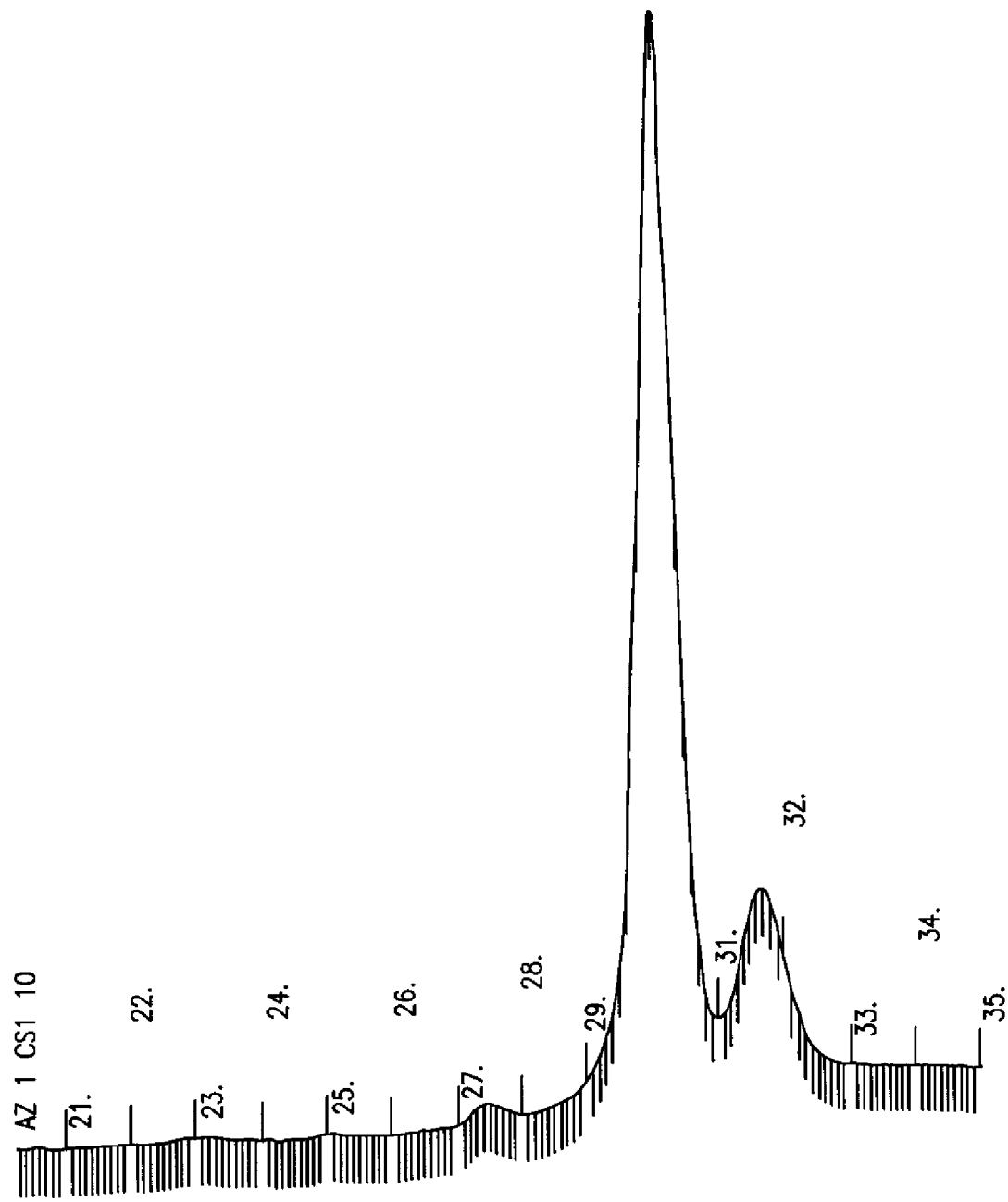
FIG. 5 is a GPC plot of dilithium PBd before the addition of TCS in Example 5.
Figure 6:
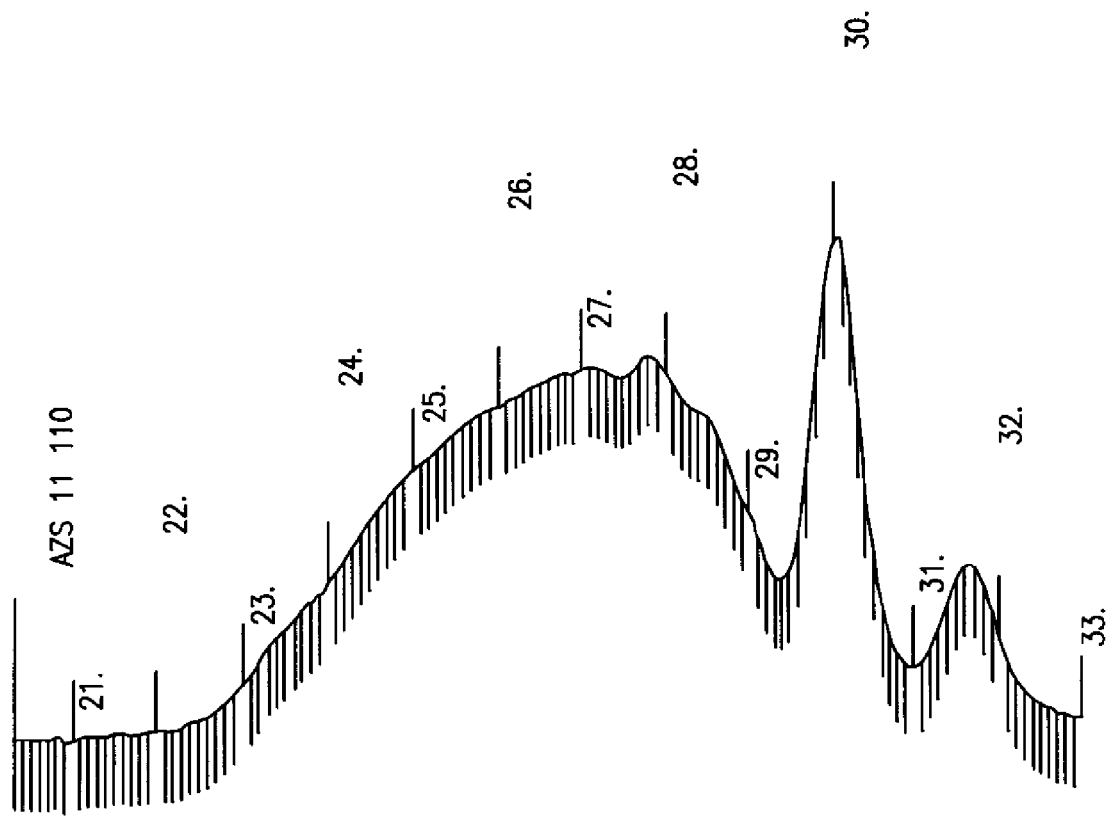
FIG. 6 is a GPC plot of the final product in Example 5.

The GPC traces of the dilithium PBd before and after mixing with TCS are shown in FIGS. 5 and 6.

Example 6

Polymerization P2

Polymerization of Butadiene

DLI was left to react with Bd for 4-5 days in a benzene solution (6% w/v) in monomer at room temperature in the presence of s-BuOLi in molar ratio [s-BuOLi/C—Li=5/1]. By SEC in THF it was found that $M_w/M_n<1.1$, $M_w\sim15$ kg/mol.

Polycondensation

Trichloromethylsilane (molar ratio 1.4/1 to living polymer) was added drop wise to a polybutadienedilithium benzene solution 2% w/v in polymer. The reaction was monitored in a GPC apparatus with THF as the mobile phase calibrated with PS standards. It was found that $M_w/M_n\sim2.0$.

Figure 7:
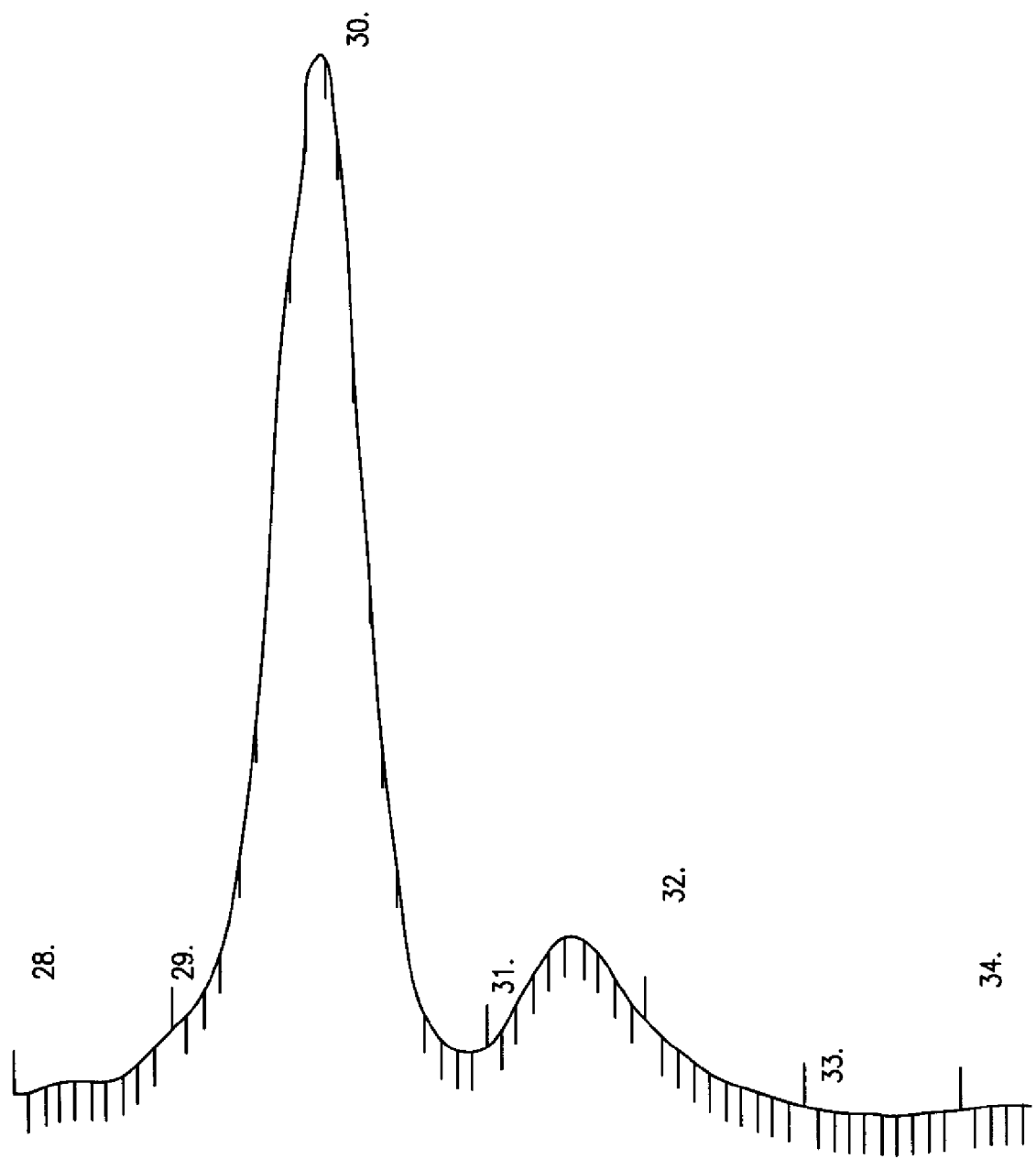
FIG. 7 is a GPC plot of dilithium PBd before the addition of TCS in Example 6.
Figure 8:
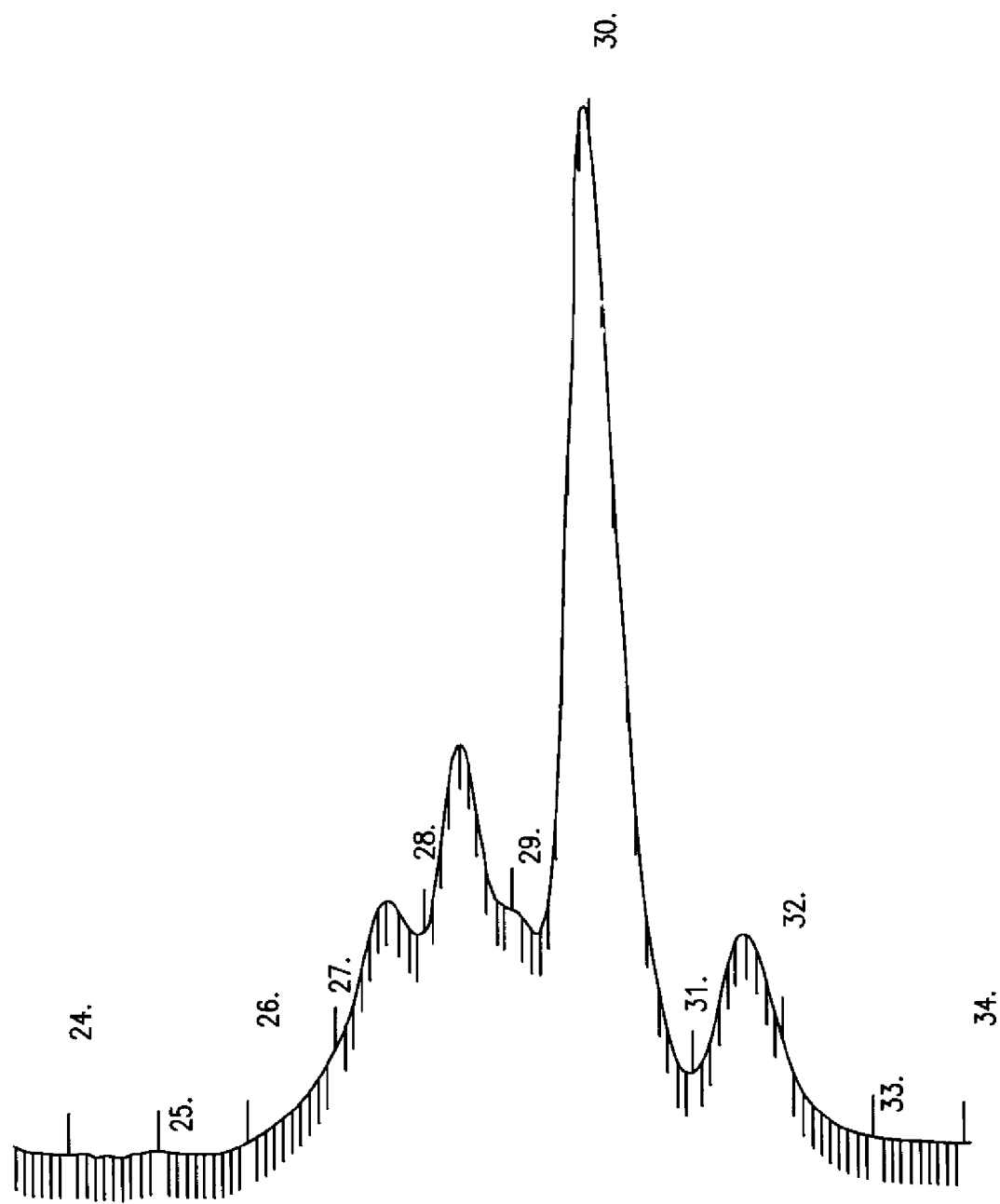
FIG. 8 is a GPC plot of the final product in Example 6.

The GPC traces of the dilithium PBd before and after mixing with TCS are shown in FIGS. 7 and 8.

Example 7

Polymerization P3

Polymerization of Butadiene

DLI was left to react with Bd for 4-5 days in a benzene solution (6% w/v in monomer) at room temperature in the presence of s-BuOLi in molar ratio [s-BuOLi/C—Li=5/1]. By SEC in THF it was found that $M_w/M_n<1.1$, $M_w\sim10$ kg/mol.

Polycondensation

Trichloromethylsilane (molar ratio 1/1 to living polymer) was added simultaneously with polybutadienedilithium in a benzene solution 2% w/v in polymer. The reaction was monitored in a GPC apparatus with CHCl$_3$ as the mobile phase calibrated with PS standards. It was found that $M_w/M_n\sim2.0$.

Figure 9:
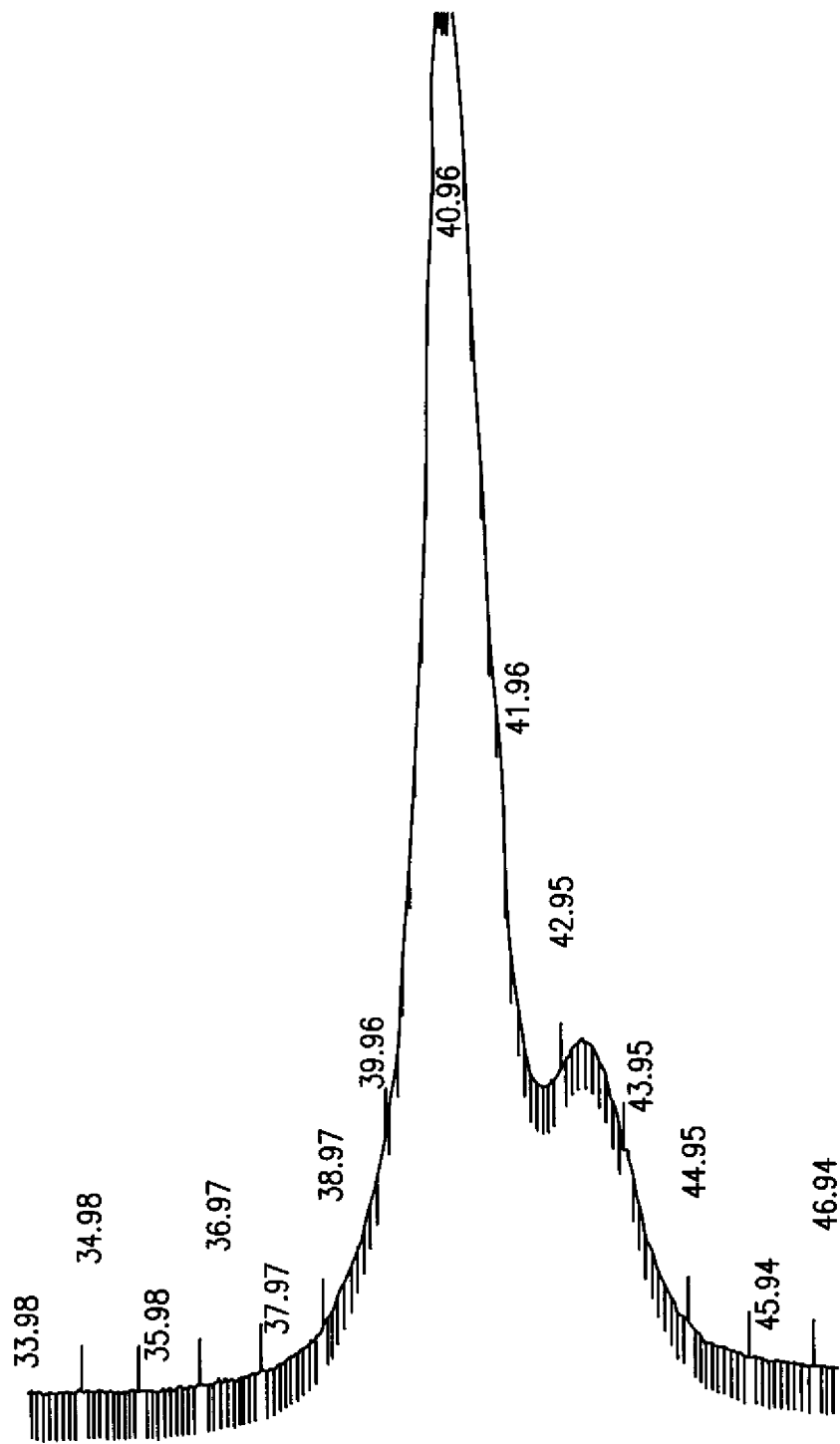
FIG. 9 is a GPC plot of dilithium PBd before the addition of TCS in Example 7.
Figure 10:
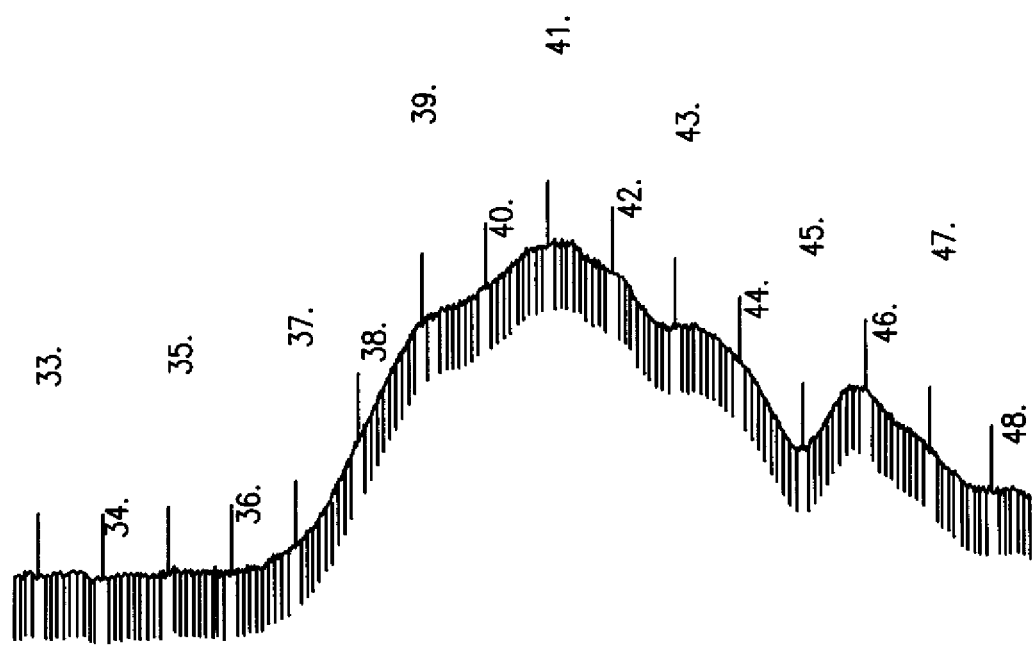
FIG. 10 is a GPC plot of the final product in Example 7.

The GPC traces of the dilithium PBd before and after mixing with TCS are shown in FIGS. 9 and 10.

Example 8

Polymerization P4

Polymerization of Butadiene

DLI was left to react with Bd for 4-5 days in a benzene solution (6% w/v in monomer) at room temperature in the presence of s-BuOLi in molar ratio [s-BuOLi/C—Li=5/1]. By SEC in THF it was found that $M_w/M_n<1.1$, $M_w\sim20$ kg/mol.

Polycondensation

Trichloromethylsilane (molar ratio 1/2 to living polymer) was added either drop-wise (P4) or simultaneously (P5) with polybutadienedilithium in a benzene solution 2% w/v in polymer. The reaction was monitored in a GPC apparatus with CHCl$_3$ as the mobile phase calibrated with PS standards. It was found that $M_w/M_n\sim2.0$.

Figure 11:
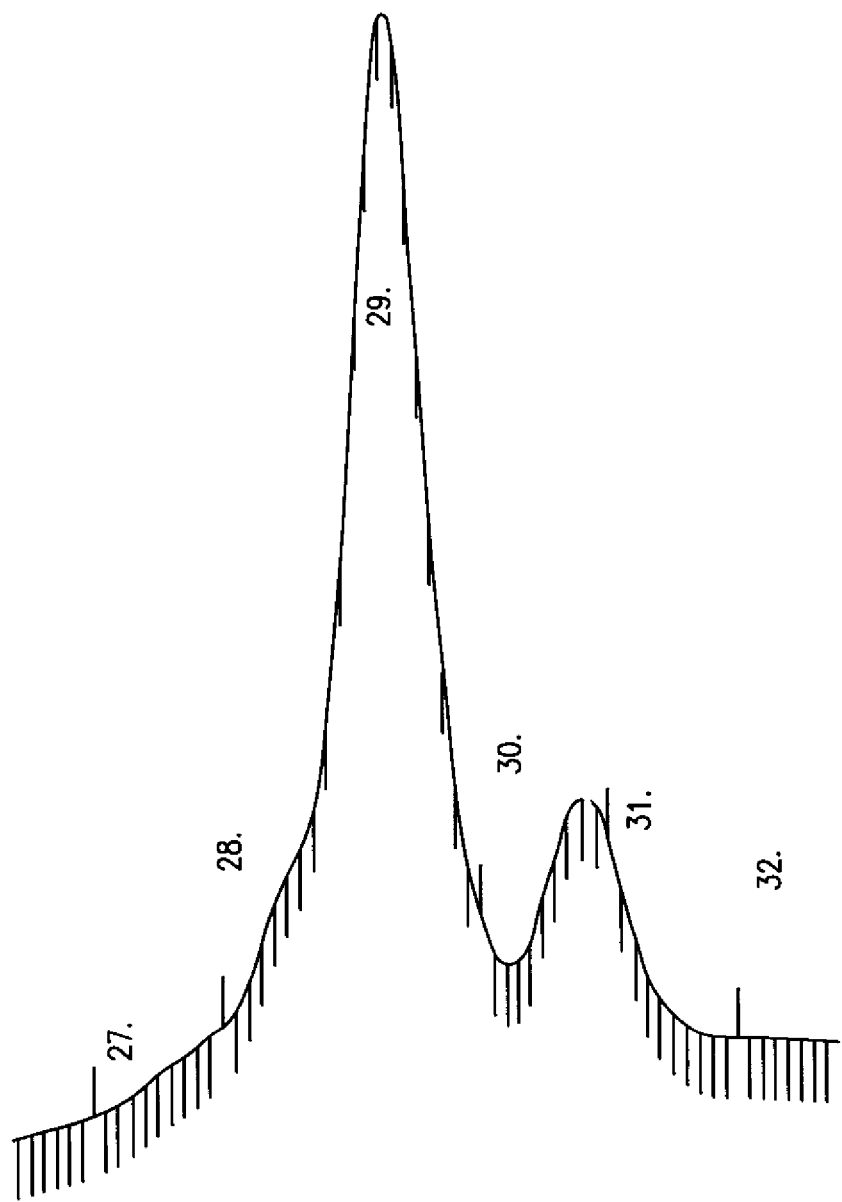
FIG. 11 is a GPC plot of dilithium PBd before the addition of TCS in Example 8.
Figure 12:
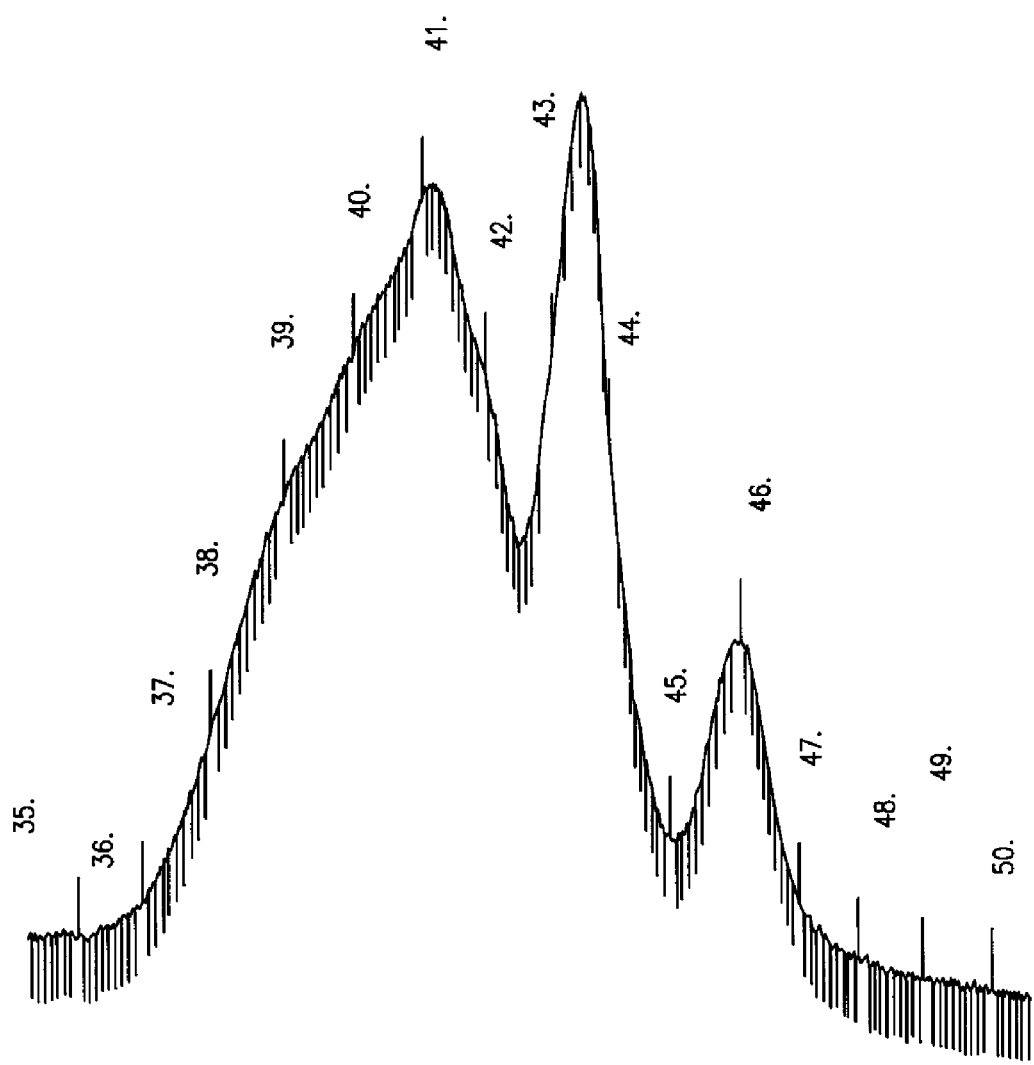
FIG. 12 is a GPC plot of the final product in Example 8.

The GPC traces of the dilithium PBd before and after mixing with TCS are shown in FIGS. 11 and 12.

Example 9

Polymerization P5

Polymerization of Butadiene

DLI was left to react with Bd for 4-5 days in a benzene solution (6% w/v in monomer) at room temperature in the presence of s-BuOLi in molar ratio [s-BuOLi/C—Li=5/1]. By SEC in THF it was found that $M_w/M_n<1.1$, $M_w\sim20$ kg/mol.

Polycondensation

Trichloromethylsilane (molar ratio 1/2 to living polymer) was added either drop-wise (P4) or simultaneously (P5) with polybutadienedilithium in a benzene solution 2% w/v in polymer. The reaction was monitored in a GPC apparatus with CHCl$_3$ as the mobile phase calibrated with PS standards. It was found that $M_w/M_n\sim2.0$.

Figure 13:
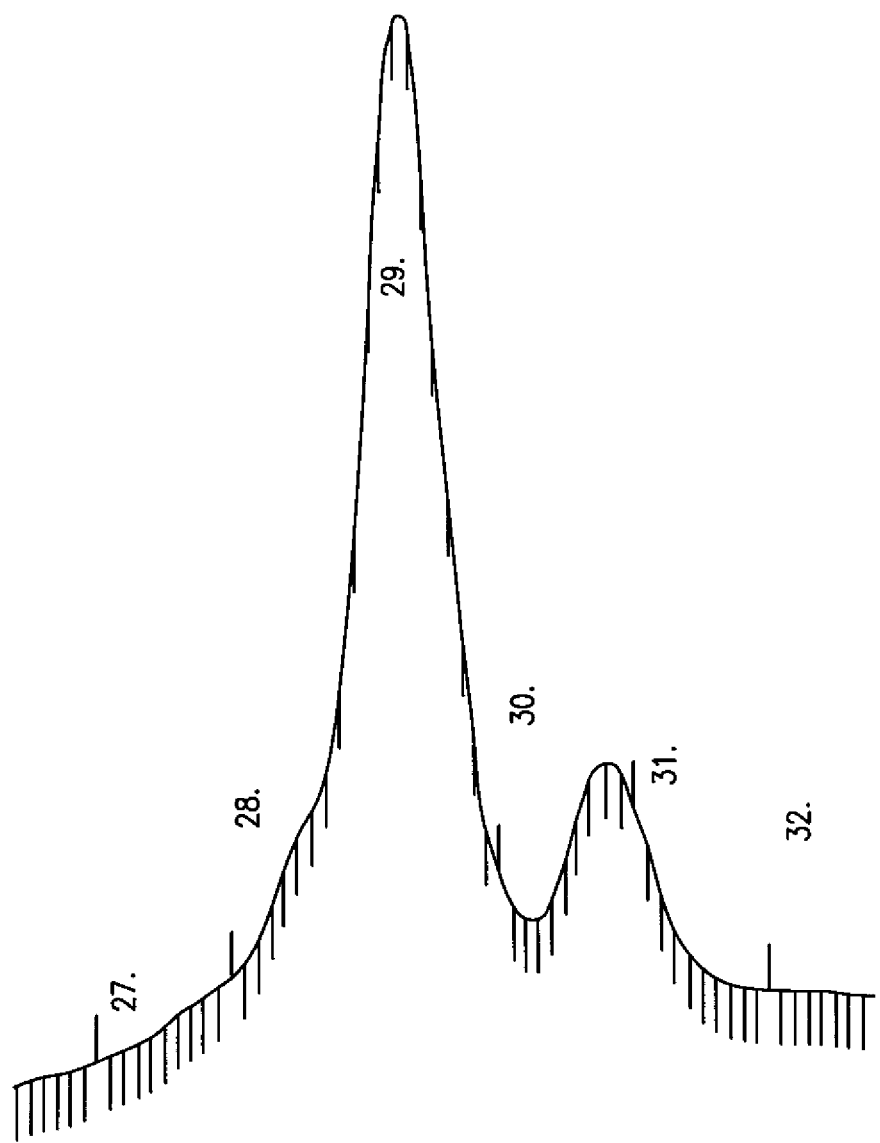
FIG. 13 is a GPC plot of dilithium PBd before the addition of TCS in Example 9.
Figure 14:
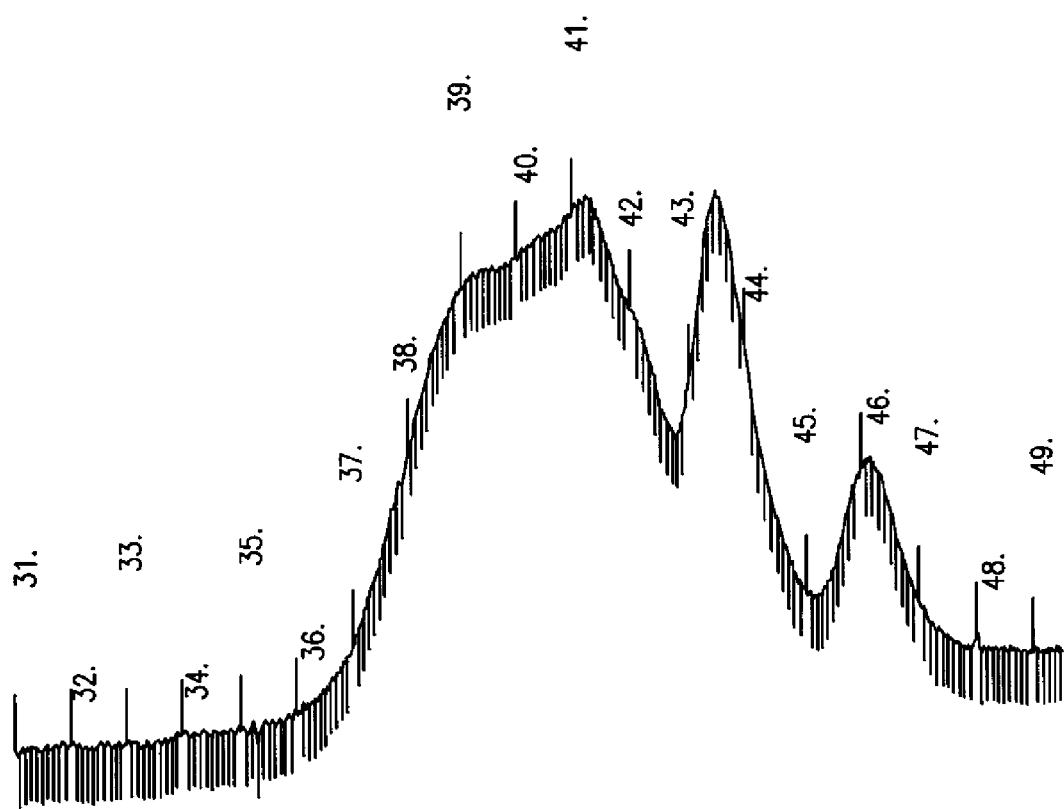
FIG. 14 is a GPC plot of the final product in Example 9.

The GPC traces of the dilithium PBd before and after mixing with TCS are shown in FIGS. 13 and 14.

Example 10

Polymerization P6

Polymerization of Butadiene

DLI was left to react with Bd for 4-5 days in a benzene solution (6% w/v in monomer) at room temperature in the presence of s-BuOLi in molar ratio [s-BuOLi/C—Li=5/1]. Better purification of butadiene took place in order to improve the quality of the living polymer. By SEC in THF it was found that $M_w/M_n\sim1.2$, $M_w\sim25$ kg/mol.

Polycondensation

Trichloromethylsilane (molar ratio 1/1 to living polymer) was added simultaneously with polybutadienedilithium in a benzene solution 2% w/v in polymer. The reaction produced was fractionated to remove the lower molecular weight species. The fractionated sample was measured in a GPC apparatus with $CHCl_3$ as the mobile phase calibrated with PS standards. It was found that $M_w/M_n \sim 1.65$, $M_w \sim 420$ kg/mol.

Figure 15:
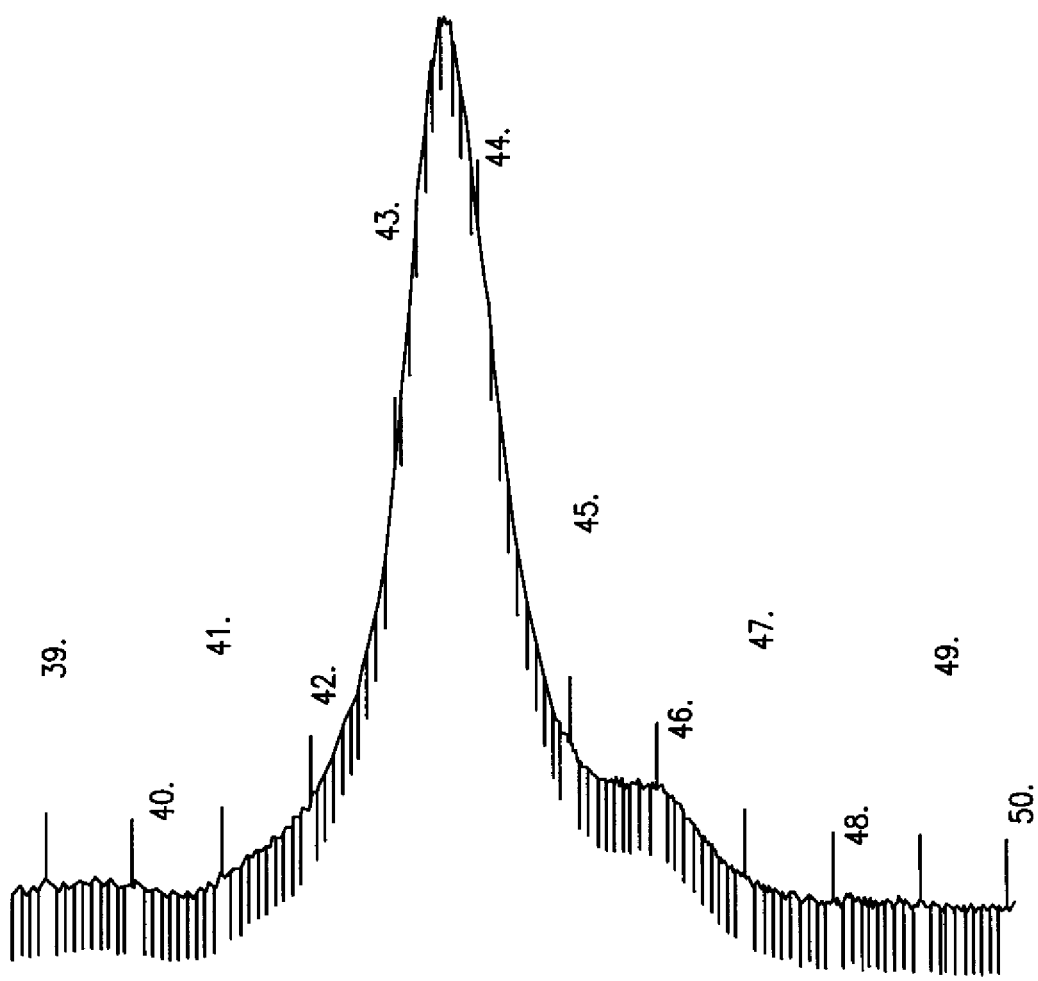
FIG. 15 is a GPC plot of dilithium PBd before the addition of TCS in Example 10.
Figure 16:
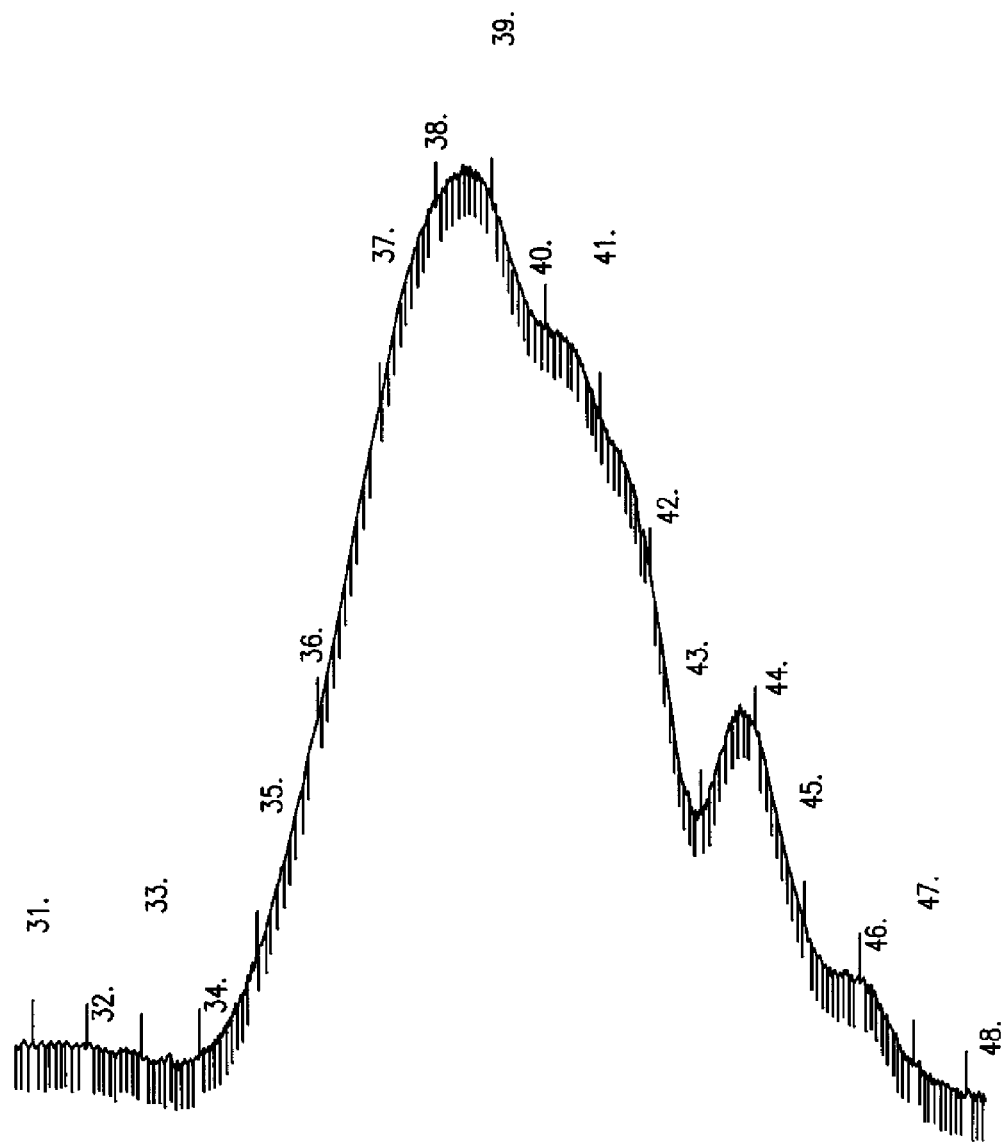
FIG. 16 is a GPC plot of the final product in Example 10. after polycondensation
Figure 17:
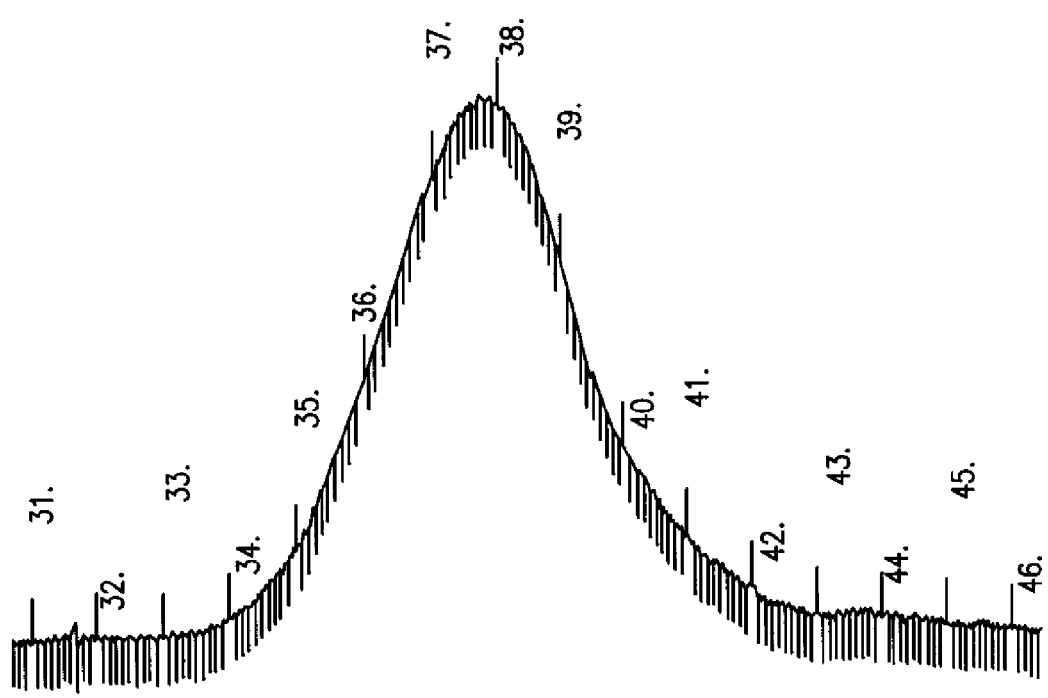
FIG. 17 is a GPC plot of the final product in Example 10 after further fractionation.

The GPC traces of the dilithium PBd before (FIG. 15) and after mixing with TCS (FIGS. 16 (after polycondensation) and 17 (fractionated hyperbranched PB)) are shown.

Example 11

Polymerization P7

Polymerization of Butadiene

DLI was left to react with Bd for 4-5 days in a benzene solution (6% w/v in monomer) at room temperature in the presence of s-BuOLi in molar ratio [s-BuOLi/C—Li=5/1]. Better purification of butadiene took place in order to improve the quality of the living polymer. By SEC in THF it was found that $M_w/M_n < 1.1$, $M_w \sim 40$ kg/mol.

Polycondensation

Trichloromethylsilane (molar ratio 1/1 to living polymer) was added simultaneously with polybutadienedilithium in a benzene solution 2% w/v in polymer. The reaction was monitored in a GPC apparatus with $CHCl_3$ as the mobile phase calibrated with PS standards. It was found that $M_w/M_n \sim 2.0$, $M_w \sim 200$ kg/mol.

Figure 18:
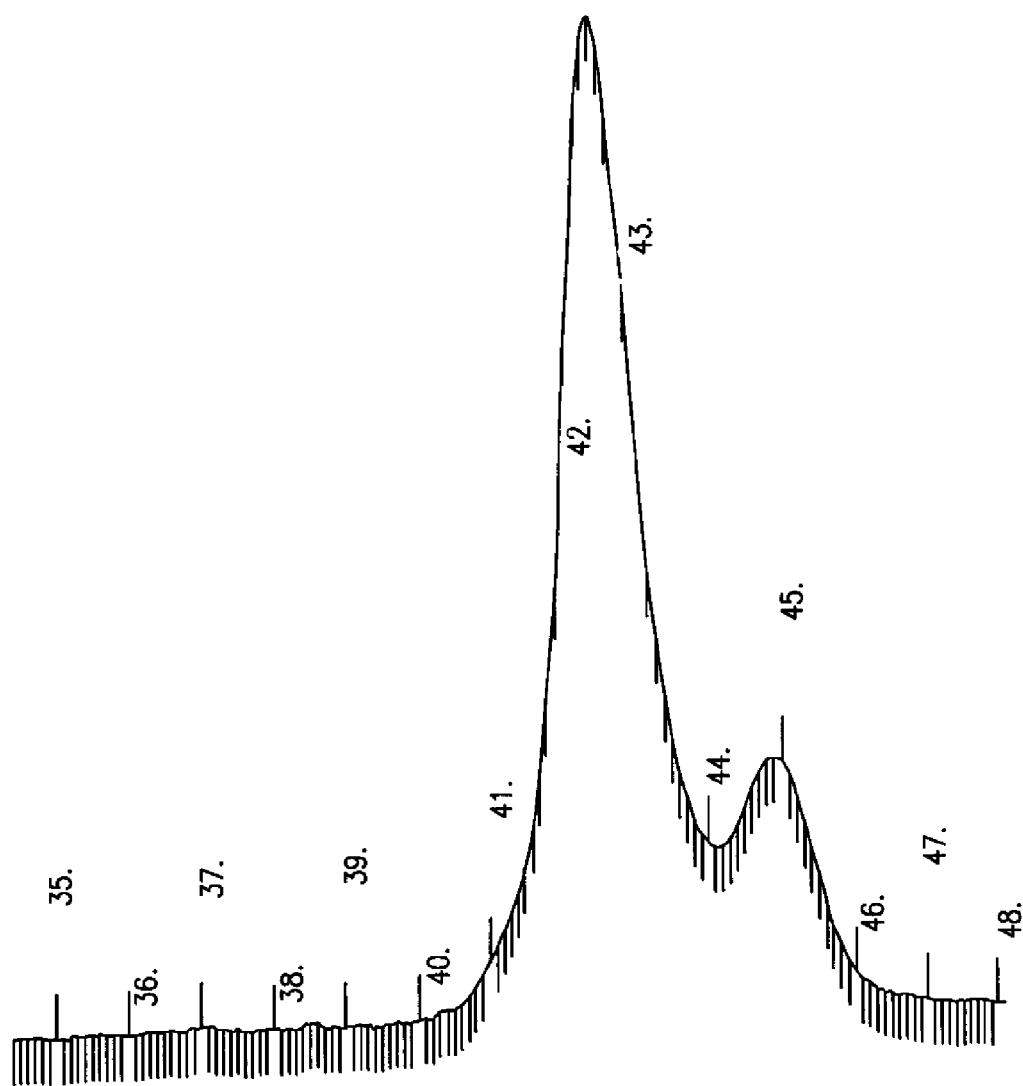
FIG. 18 is a GPC plot of dilithium PBd before the addition of TCS in Example 11.
Figure 19:
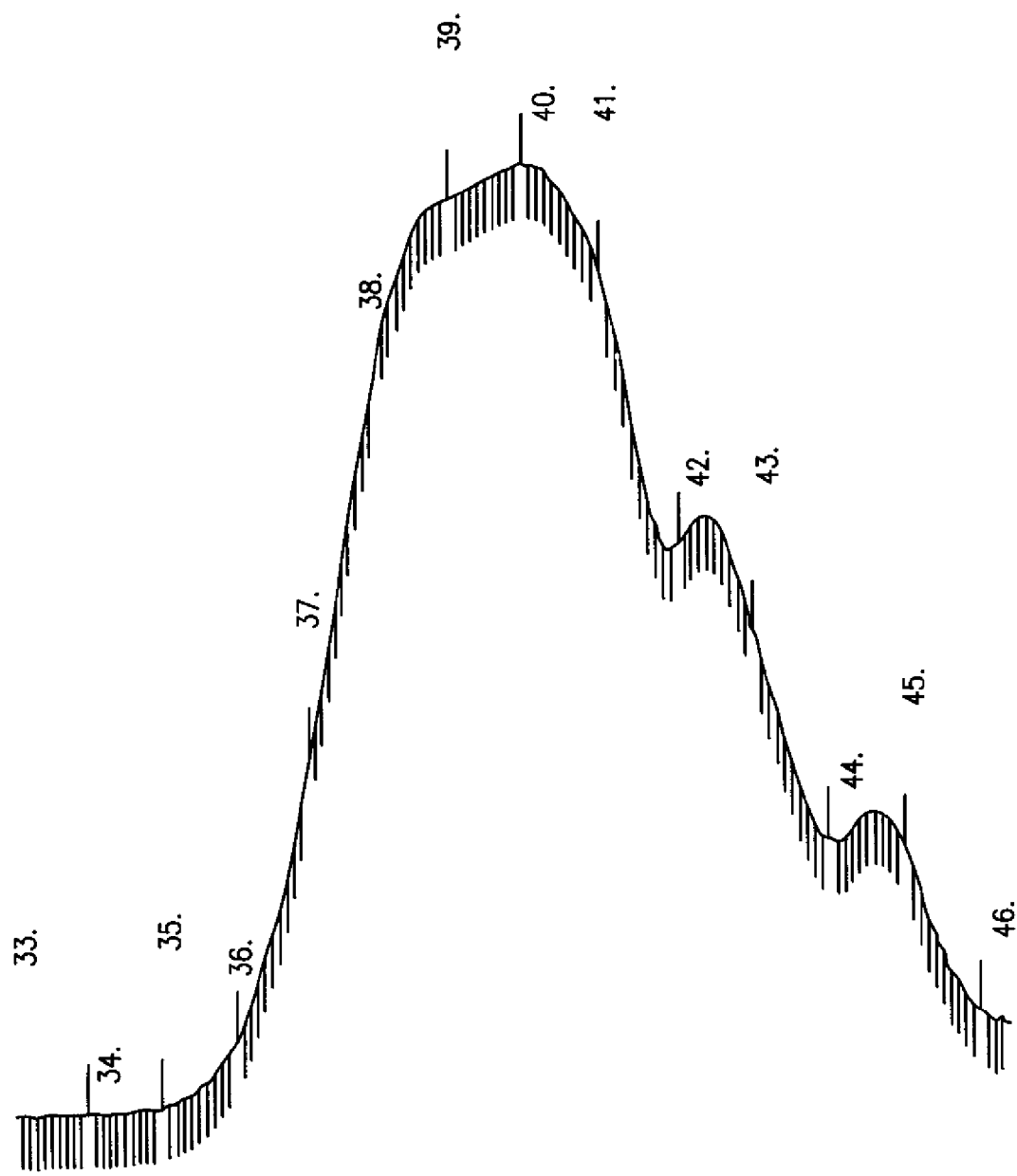
FIG. 19 is a GPC plot of the final product in Example 11.

The GPC traces of the dilithium PBd before and after mixing with TCS are shown in FIGS. 18 and 19.

Example 12

Polymerization P9

Polymerization of Butadiene

DLI was left to react with Bd for 4 days in a benzene solution (4% w/v in monomer) at room temperature in the presence of s-BuOLi in molar ratio [s-BuOLi/C—Li=1/1]. Better purification of butadiene took place in order to improve the quality of the living polymer. The microstructure was the desirable (90% 1,4) as determined by $^1$H-NMR. By SEC in THF it was found that $M_w/M_n \sim 1.04$, $M_w \sim 24$ kg/mol.

Polycondensation

Trichloromethylsilane (molar ratio 1/1 to living polymer) was added simultaneously with polybutadienedilithium in a benzene solution 2% w/v in polymer. The reaction was monitored in a GPC apparatus with THF as the mobile phase calibrated with PS standards. It was found that $M_w/M_n \sim 1.7$.

Figure 20:
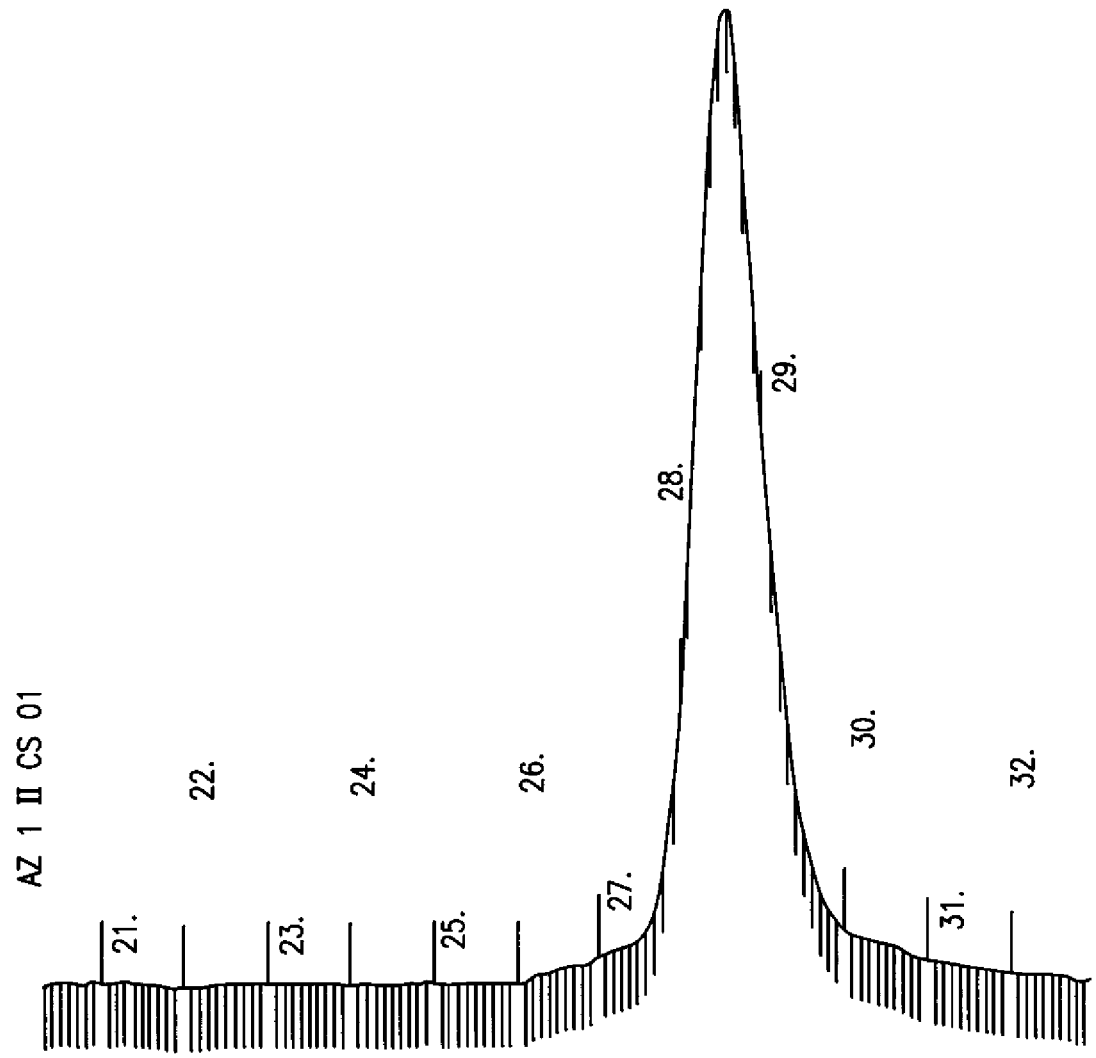
FIG. 20 is a GPC plot of dilithium PBd before the addition of TCS in Example 12.
Figure 21:
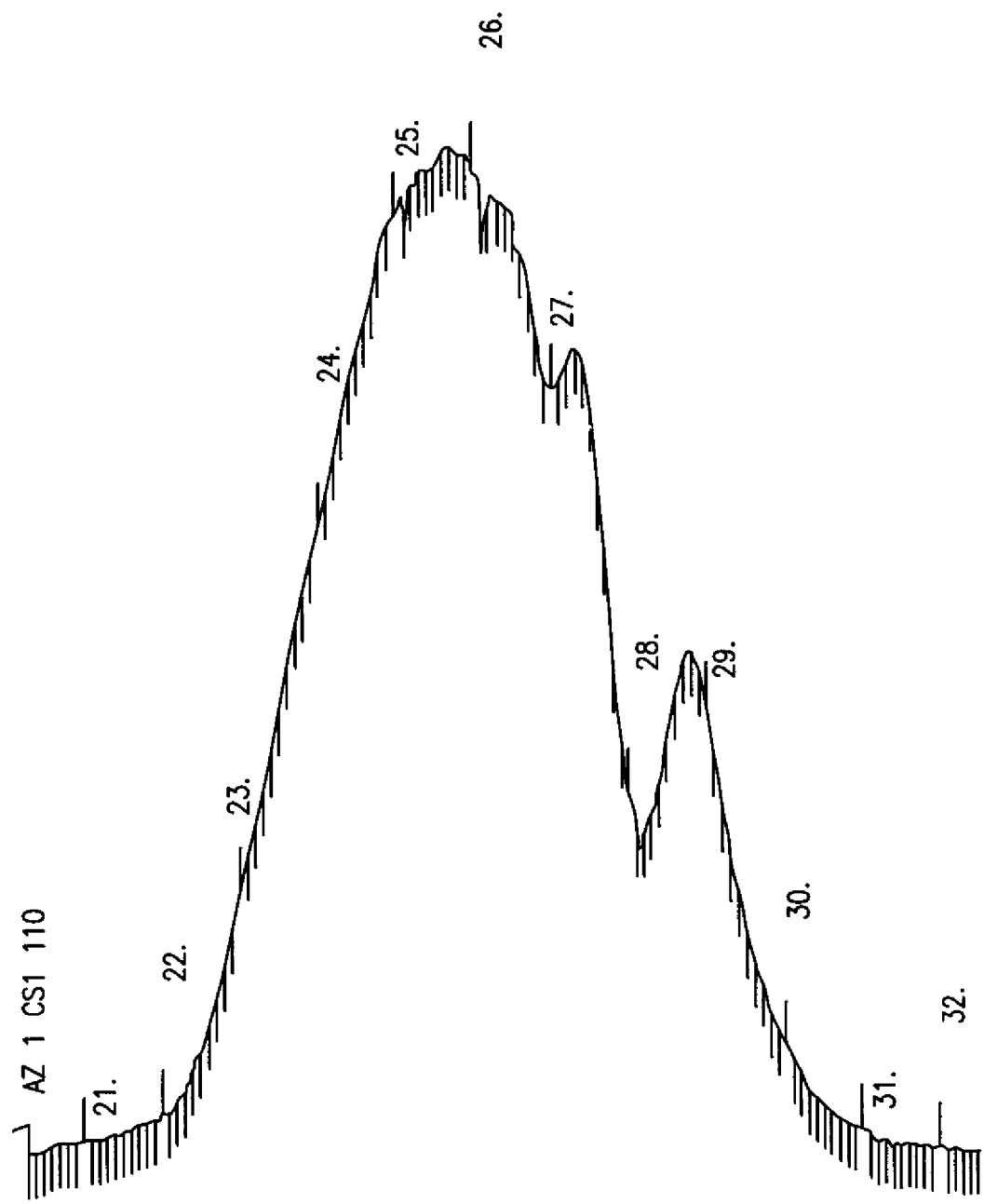
FIG. 21 is a GPC plot of the final product in Example 12.

The GPC traces of the dilithium PBd before and after mixing with TCS are shown in FIGS. 20 and 21.

Summary of Experimental Results

The results of the polymerizations of polymers P1-P7 and P9 above are summarized in the following table:

PCT and EP Clauses:

1. A process for making a substantially saturated dendritic hydrocarbon polymer, comprising: polymerizing an amount of one or more alkadiene monomers and/or one or more alkenylaromatic polymers under anionic conditions in the presence of a functional organic lithium initiator to produce a hydrocarbon polymer defining a multiplicity of lithiated chain ends; reacting the hydrocarbon polymer with an amount of a functional silane coupling agent to form a dendritic hydrocarbon polymer; and hydrogenating the dendritic hydrocarbon polymer to form a substantially saturated dendritic hydrocarbon polymer.

2. The process of clause 1 wherein the functional organic lithium initiator is difunctional and the functional silane coupling agent is trifunctional.

3. The process of clause 1 wherein the functional organic lithium initiator is trifunctional and the functional silane coupling agent is difunctional.

4. The process of any one of the preceding clauses, wherein the saturated dendritic hydrocarbon polymer is a saturated dendritic polyalkadiene.

5. The process of clauses 1-3, wherein the saturated dendritic hydrocarbon polymer is a saturated polyalkenylaromatic.

6. The process of any one of the preceding clauses, wherein the one or more alkadiene monomers are chosen from 1,3-butadiene, isoprene, 2-methyl-1,3-pentadiene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and combinations thereof.

7. The process of any one of the preceding clauses, wherein the one or more alkenylaromatic polymers are chosen from styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene, 4,5-dimethyl-l-vinylnaphthalene, and combinations of the foregoing.

8. The process of any one of the preceding clauses, wherein hydrogenation is carried out at a temperature of 40° C. to 160° C. at a pressure of 1 to 7500 psig, and for a time from 0.1 seconds to 120 minutes, and wherein the process is a continuous process.

| Sample | Linking Method | [sBuOLI]: [C—Li] | [TCS]: [DLiPBd] | $M_{linker}$ (kg/mol) | $M_w/M_n$ | $M_{total}$ (kg/mol) | $M_w/M_n$ | 1,2 content (%) |
|---|---|---|---|---|---|---|---|---|
| P1 | A | 5:1 | 1:1 | 15 | 1.1 | | 2.0 | |
| P2 | A | 5:1 | 1.4:1 | 15 | 1.1 | | 2.0 | |
| P3 | B | 5:1 | 1:1 | 10 | 1.1 | 210 | 2.0 | 49.1 |
| P4 | A | 5:1 | 1:1 | 20 | 1.1 | 210 | 2.0 | 60.6 |
| P5 | B | 5:1 | 1:1 | 20 | 1.1 | 210 | 2.0 | 60.2 |
| P6 | B | 5:1 | 1:1 | 25 | 1.2 | 450 | 1.65 | 35.1 |
| P7 | B | 5:1 | 1:1 | 40 | 1.1 | 300 | 2.0 | 42.0 |
| P9 | B | 1:1 | 1:2.1 | 24 | 1.04 | | 1.7 | 10.4 |

Method A: dripwise addition of trichloro silane (TCS)
Method B: simultaneous addition of trichloro silane (TCS)

9. The process of clauses 2 and 4-8, wherein the difunctional organic lithium initiator is 1,3-bis(1-phenyl-3-methylpentyl lithium)benzene or 1,3-bis(1,3-dimethylpentyl lithium)benzene.

10. The process of clauses 2 and 4-9, wherein the trifunctional silane coupling agent is chosen from one or more compounds within the formula $X_3Si(CH_2)_nH\}_2$ and $X_2(CH_3)_2Si$—$(CH_2)_n$—$Si(CH_3)_2X$, wherein n≥=0 and X is a halogen or an alkoxy.

11. The process of clauses 2, and 4-10, wherein the trifunctional silane coupling agent is chosen from trichloromethylsilane, trichloroethoxysilane, 1-dichloromethyl-2-chlorodimethyl-disiloxane, and 1-dichloromethylsilyl-2-chlorodimethylsilyl ethane.

12. The process of clauses 3-8, wherein the trifunctional organic lithium initiator is bis-(1-lithio-1,3-dimethylpentyl) benzene.

13. The process of clauses 3-8 and 12, wherein the difunctional silane coupling agent is chosen from one or more compounds within the formula $X_2Si\{(CH_2)_nH\}_2$ and $X(CH_3)_2Si$—$(CH_2)_n$—$Si(CH_3)_2X$, wherein n>=0 and X is a halogen or an alkoxy.

14. The process of clause 13, wherein the difunctional silane coupling agent is chosen from dichlorodimethylsilane, dichlorodiethoxysilane, and 1,2-bis(dimethylchloro)ethane.

15. A process for making a dendritic hydrocarbon polymer, comprising: (a) polymerizing an amount of one or more alkadiene monomers and/or one or more alkenylaromatic polymers under anionic conditions in the presence of a functional organic lithium initiator to produce a hydrocarbon polymer defining a multiplicity of lithiated chain ends; and (b) reacting the hydrocarbon polymer with an amount of a functional silane coupling agent to form a dendritic hydrocarbon polymer.

16. The process of clause 15 wherein the functional organic lithium initiator is difunctional and the functional silane coupling agent is trifunctional.

17. The process of clause 15 wherein the functional organic lithium initiator is trifunctional and the functional silane coupling agent is difunctional.

A process for making a substantially saturated dendritic hydrocarbon polymer. The process has the following steps: (a) polymerizing an amount of one or more alkadiene monomers and/or one or more alkenylaromatic polymers under anionic conditions in the presence of a di- or tri-functional organic lithium initiator to produce a polyalkadiene defining a multiplicity of lithiated chain ends; (b) reacting the polyalkadiene with an amount of a tri- or di-functional silane coupling agent to form a dendritic polyalkadiene; and (c) hydrogenating the dendritic polyalkadiene to form a substantially saturated dendritic hydrocarbon polymer. Also a process for process for making a dendritic hydrocarbon polymer, comprising: (a) polymerizing an amount of one or more alkadiene monomers and/or one or more alkenylaromatic polymers under anionic conditions in the presence of a di- or tri-functional organic lithium initiator to produce a hydrocarbon polymer defining a multiplicity of lithiated chain ends; and (b) reacting the hydrocarbon polymer with an amount of a tri- or di-functional silane coupling agent to form a dendritic hydrocarbon polymer.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A process for making a substantially saturated dendritic hydrocarbon polymer, comprising:
    (a) polymerizing an amount of one or more alkadiene monomers and/or one or more alkenylaromatic monomers under anionic conditions in the presence of a difunctional organic lithium initiator to produce a hydrocarbon polymer defining a multiplicity of lithiated chain ends;
    (b) reacting the hydrocarbon polymer with an amount of a trifunctional silane coupling agent to form a dendritic hydrocarbon polymer; and
    (c) hydrogenating the dendritic hydrocarbon polymer to form a substantially saturated dendritic hydrocarbon polymer including on average fewer than 10 double bonds per hydrocarbon polymer chain,
    wherein the $M_w/M_n$ of the substantially saturated dendritic hydrocarbon polymer ranges from 1.65 to 2.0.

2. The process of claim 1, wherein the saturated dendritic hydrocarbon polymer is a saturated dendritic polyalkadiene.

3. The process of claim 1, wherein the saturated dendritic hydrocarbon polymer is a saturated polyalkenylaromatic.

4. The process of claim 1, wherein the one or more alkadiene monomers are chosen from 1,3-butadiene, isoprene, 2-methyl-1,3-pentadiene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and combinations thereof.

5. The process of claim 1, wherein the one or more alkenylaromatic monomers are chosen from styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene, 4,5-dimethyl-1-vinylnaphthalene, and combinations of the foregoing.

6. The process of claim 1, wherein hydrogenation is carried out at a temperature of 40° C. to 160° C. at a pressure of 1 to 7500 psig, and for a time from 0.1 seconds to 120 minutes, and wherein the process is a continuous process.

7. The process of claim 1, wherein the difunctional organic lithium initiator is 1,3-bis(1-phenyl-3-methylpentyl lithium) benzene or 1,3-bis(1,3-dimethylpentyl lithium)benzene.

8. The process of claim 1, wherein the trifunctional silane coupling agent is chosen from one or more compounds within the formula $X_3Si(CH2)_nH$ and $X_2(CH_3)_2Si$—$(CH_2)_n$—$Si(CH_3)_2X$, wherein n≥0 and X is a halogen or an alkoxy.

9. The process of claim 1, wherein the trifunctional silane coupling agent is chosen from trichloromethylsilane, trichloroethoxysilane, 1-dichloromethyl-2-chlorodimethyl-disiloxane, and 1-dichloromethylsilyl-2-chlorodimethylsilyl ethane.

10. A process for making a dendritic hydrocarbon polymer, comprising:
(a) polymerizing an amount of one or more alkadiene monomers and/or one or more alkenylaromatic monomers under anionic conditions in the presence of a difunctional organic lithium initiator to produce a hydrocarbon polymer defining a multiplicity of lithiated chain ends; and
(b) reacting the hydrocarbon polymer with an amount of a trifunctional silane coupling agent to form a dendritic hydrocarbon polymer,
wherein the $M_w/M_n$ of the dendritic hydrocarbon polymer ranges from 1.65 to 2.0.

11. A process for making a substantially saturated dendritic hydrocarbon polymer, comprising:
(a) polymerizing an amount of one or more alkadiene monomers and/or one or more alkenylaromatic monomers under anionic conditions in the presence of a trifunctional organic lithium initiator to produce a hydrocarbon polymer defining a multiplicity of lithiated chain ends;
(b) reacting the hydrocarbon polymer with an amount of a difunctional silane coupling agent to form a dendritic hydrocarbon polymer; and
(c) hydrogenating the dendritic hydrocarbon polymer to form a substantially saturated dendritic hydrocarbon polymer including on average fewer than 10 double bonds per hydrocarbon polymer chain.

12. The process of claim 11, wherein the saturated dendritic hydrocarbon polymer is a saturated dendritic polyalkadiene.

13. The process of claim 11, wherein the saturated dendritic hydrocarbon polymer is a saturated polyalkenylaromatic.

14. The process of claim 11, wherein the one or more alkadiene monomers is chosen from 1,3-butadiene, isoprene, 2-methyl-1,3-pentadiene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and combinations thereof.

15. The process of claim 11, wherein the one or more alkenylaromatic monomers is chosen from styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene, 4,5-dimethyl-1-vinylnaphthalene, and combinations of the foregoing.

16. The process of claim 11, wherein hydrogenation is carried out at a temperature of 40° C. to 160° C. at a pressure of 1 to 7500 psig, and for a time from 0.1 seconds to 120 minutes, and wherein the process is a continuous process.

17. The process of claim 11, wherein the trifunctional organic lithium initiator is

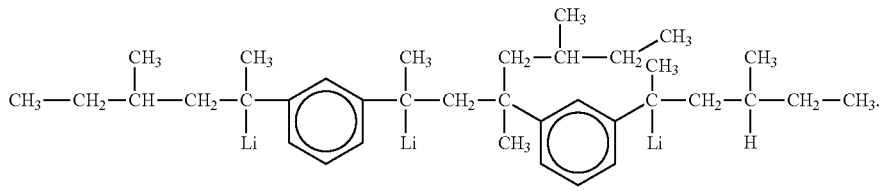

18. The process of claim 11, wherein the difunctional silane coupling agent is chosen from one or more compounds within the formula $X_2Si\{(CH_2)_nH\}_2$ and $X(CH_3)_2Si—(CH_2)_n—Si(CH_3)_2X$, wherein $n>=0$ and X is a halogen or an alkoxy.

19. The process of claim 11, wherein the difunctional silane coupling agent is chosen from dichlorodimethylsilane, dichlorodiethoxysilane, and 1,2-bis(dimethylchloro)ethane.

20. A process for making a substantially saturated dendritic hydrocarbon polymer, comprising:
(a) polymerizing an amount of one or more alkadiene monomers and/or one or more alkenylaromatic monomers under anionic conditions in the presence of a trifunctional organic lithium initiator to produce a hydrocarbon polymer defining a multiplicity of lithiated chain ends;
(b) reacting the hydrocarbon polymer with an amount of a difunctional silane coupling agent to form a dendritic hydrocarbon polymer; and
(c) hydrogenating the dendritic hydrocarbon polymer to form a substantially saturated dendritic hydrocarbon polymer, wherein the saturated dendritic hydrocarbon polymer is a saturated dendritic polyalkadiene.

* * * * *